(12) United States Patent
Lai et al.

(10) Patent No.: US 12,700,728 B2
(45) Date of Patent: Aug. 4, 2026

(54) POWER SUPPLY EQUIPMENT AND METHOD OF OPERATING THE SAME

(71) Applicant: DELTA ELECTRONICS, INC., Taoyuan City (TW)

(72) Inventors: Chien-An Lai, Taoyuan City (TW); Guo-Ning Chen, Taoyuan City (TW); Yung-Yuan Hsiao, Taoyuan City (TW)

(73) Assignee: DELTA ELECTRONICS, INC., Taoyuan City (TW)

( * ) Notice: Subject to any disclaimer, the term of this patent is extended or adjusted under 35 U.S.C. 154(b) by 56 days.

(21) Appl. No.: 18/891,809

(22) Filed: Sep. 20, 2024

(65) Prior Publication Data

US 2025/0112471 A1 Apr. 3, 2025

Related U.S. Application Data

(60) Provisional application No. 63/586,201, filed on Sep. 28, 2023.

(51) Int. Cl.
| | |
|---|---|
| *H02J 1/08* | (2026.01) |
| *H02J 1/102* | (2026.01) |
| *H02J 1/108* | (2026.01) |
| *H02J 3/02* | (2026.01) |
| *H02J 3/466* | (2026.01) |
| *H02J 4/25* | (2026.01) |

(52) U.S. Cl.
CPC .............. *H02J 1/084* (2020.01); *H02J 1/086* (2020.01); *H02J 1/102* (2013.01); *H02J 1/108* (2013.01); *H02J 3/02* (2013.01); *H02J 3/472* (2020.01); *H02J 4/25* (2026.01)

(58) Field of Classification Search
CPC .... H02J 1/084; H02J 3/02; H02J 3/472; H02J 5/00; H02M 1/32
USPC ......................................................... 307/43
See application file for complete search history.

(56) References Cited

U.S. PATENT DOCUMENTS

| | | | |
|---|---|---|---|
| 8,908,402 B2 | 12/2014 | Kopf et al. | |
| 9,178,414 B2 | 11/2015 | Lin et al. | |
| 9,811,139 B2 * | 11/2017 | Tsai ........................ | G06F 1/263 |
| 2007/0194746 A1 | 8/2007 | Yoshimoto | |
| 2009/0058187 A1 | 3/2009 | Chang | |

(Continued)

FOREIGN PATENT DOCUMENTS

| | | |
|---|---|---|
| CN | 1980020 A | 6/2007 |
| CN | 102064682 A | 5/2011 |

(Continued)

OTHER PUBLICATIONS

Partial Search Report dated Mar. 3, 2025 of the relating EP patent application No. 24201776.2.

(Continued)

*Primary Examiner* — Hal Kaplan
(74) *Attorney, Agent, or Firm* — MUNCY, GEISSLER, OLDS & LOWE, P.C.

(57) ABSTRACT

A power supply equipment supplies power to a critical load and a non-critical load. The power supply equipment includes a plurality of power supplies coupled in parallel and a system controller. The system controller is coupled to the power supplies, and communicates with the power supplies to set a specific sequence. The system controller notifies the power supplies to adjust operating frequencies to be inconsistent according to the specific sequence.

19 Claims, 22 Drawing Sheets

(56)  References Cited

U.S. PATENT DOCUMENTS

| | | |
|---|---|---|
| 2010/0109433 A1 | 5/2010 | Chen et al. |
| 2011/0140519 A1 | 6/2011 | Lo et al. |
| 2011/0242868 A1 | 10/2011 | Gray et al. |
| 2012/0159202 A1 | 6/2012 | Xu et al. |
| 2015/0180278 A1 | 6/2015 | Tsai |
| 2015/0244207 A1 | 8/2015 | Narita |
| 2020/0127463 A1 | 4/2020 | Humphrey et al. |

FOREIGN PATENT DOCUMENTS

| | | |
|---|---|---|
| CN | 102347683 A | 2/2012 |
| CN | 102377233 A | 3/2012 |
| CN | 202210758 U | 5/2012 |
| CN | 107070242 A | 8/2017 |
| CN | 113949262 A | 1/2022 |
| JP | 2007202387 A | 8/2007 |
| JP | 2012509045 A | 4/2012 |
| JP | 2015220859 A | 12/2015 |
| JP | 2018147007 A | 9/2018 |
| TW | 201122794 A | 7/2011 |

OTHER PUBLICATIONS

Partial Search Report dated Feb. 27, 2025 of the corresponding EP patent application No. 24201775.4.

Search Report dated Dec. 11, 2024 of the relating PCT patent application No. PCT/CN2024/119965.

Office Action dated May 5, 2025 of the relatingTW patent application No. 113135682, 5 pages.

Office Action dated May 5, 2025 of the corresponding TW patent application No. 113135681, 5 pages.

Search Report dated Dec. 1, 2025 of the relating divisional EP patent application No. 25196287.4.

* cited by examiner

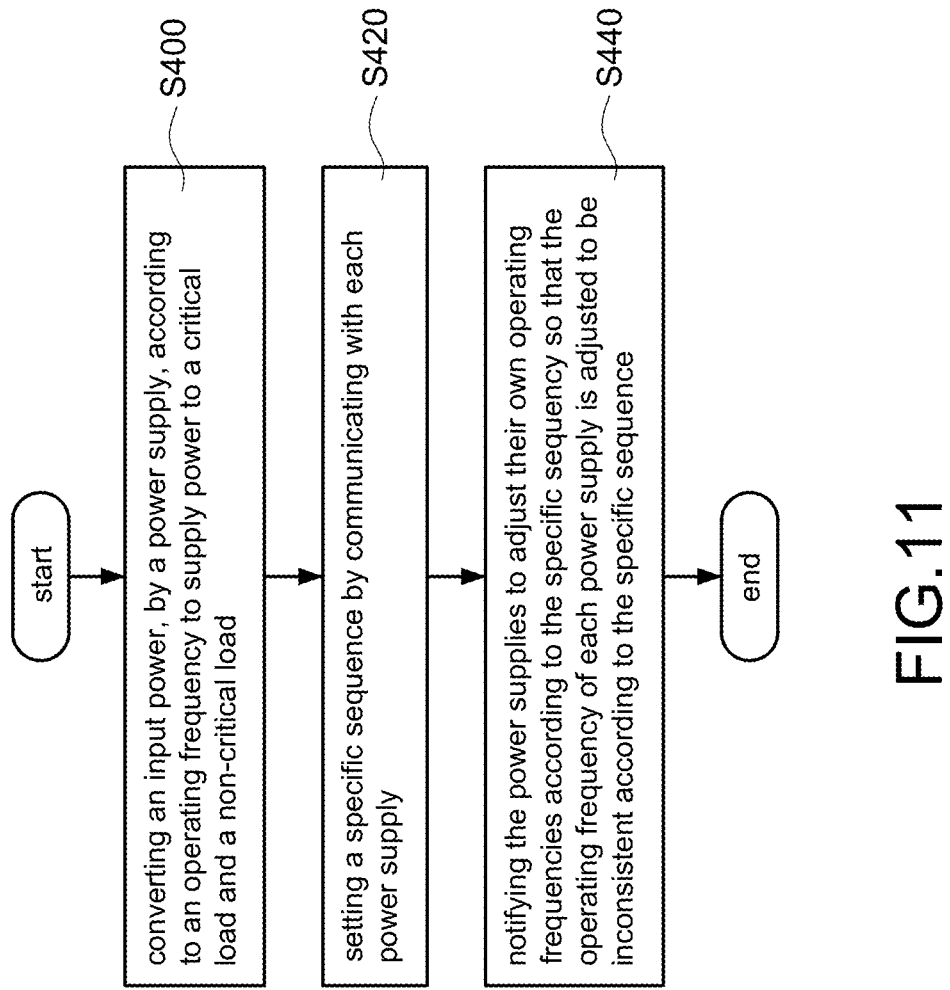

start converting an input power, by a power supply, according to an operating frequency to supply power to a critical load and a non-critical load — S400 setting a specific sequence by communicating with each power supply — S420 notifying the power supplies to adjust their own operating frequencies according to the specific sequence so that the operating frequency of each power supply is adjusted to be inconsistent according to the specific sequence — S440 end

FIG.11

POWER SUPPLY EQUIPMENT AND METHOD OF OPERATING THE SAME

CROSS-REFERENCE TO RELATED APPLICATION

This patent application claims the benefit of U.S. Provisional Patent Application No. 63/586,201, filed Sep. 28, 2023, which is incorporated by reference herein.

BACKGROUND

Technical Field

The present disclosure relates to a power supply equipment and a method of operating the same, and more particularly to a power supply equipment and a method of operating the same capable of suppressing electromagnetic interference.

Description of Related Art

The statements in this section merely provide background information related to the present disclosure and do not necessarily constitute prior art.

In the technical field of electronic products, most power sources are provided by power supply units (PSU). Therefore, power supplies have become an indispensable device for electronic products. In response to the latest energy efficiency requirements, in addition to increasing the efficiency of the main power loop as much as possible, the power loss of the auxiliary power of the power supply units should also be considered. The main reason is that if only considering the efficiency improvement of the main power circuit without considering how to reduce the power loss of the auxiliary power, it will inevitably lead to a decrease in power density and a loss of efficiency.

Specifically, as shown in FIG. 1, in the prior art, a power supply 100 usually includes a power factor correction (PFC) circuit, a main conversion circuit 1, and an auxiliary power circuit 2. The main conversion circuit 1 and the auxiliary power circuit 2 are coupled to the power factor correction circuit PFC. The power factor correction circuit PFC is mainly used to convert the AC input power Pin into the DC power Pdc, and perform power factor correction on the input power Pin. The main conversion circuit 1 is mainly used to convert the DC power Pdc into a main output power Pm, and provide the main output power Pm to supply power to a rear-end coupled critical load Load_C, such as but not limited to a central processing unit (CPU), a main control system, etc., loads that require high power. The auxiliary power circuit 2 is mainly used to convert the DC power Pdc into an auxiliary power Pa, and provide the auxiliary power Pa to supply power to a rear-end coupled non-critical load Load_NC, such as but not limited to, a fan, a microcontroller (MCU) inside the power supply, etc., loads that require low power.

Therefore, how to design a power supply equipment and a method of operating the same to reduce system-level noise accumulation and avoid excessive electromagnetic interference has become a critical topic in this field.

SUMMARY

In order to solve the above-mentioned problems, the present disclosure provides power supply equipment. The power supply equipment supplies power to a critical load and a non-critical load. The power supply equipment includes a plurality of power supplies. The plurality of power supplies is coupled in parallel, and each power supply includes a control module and a system controller. The control module controls one power supply belonging to the control module to convert an input power according to an operating frequency so as to supply power to the critical load and the non-critical load. The system controller is coupled to the control module of each power supply, and communicates with the control module to set a specific sequence. The system controller notifies the control modules of the plurality of power supplies to adjust the operating frequencies to be inconsistent according to the specific sequence.

In order to solve the above-mentioned problems, the present disclosure provides a method of operating a power supply equipment. The power supply equipment supplies power to a critical load and a non-critical load, and the power supply equipment includes a plurality of power supplies. The method includes steps of: converting an input power, by the power supplies, to supply power to the critical load and the non-critical load according to operating frequencies, communicating with each other of the power supplies to set a specific sequence, and notifying the power supplies to adjust the operating frequencies to be inconsistent according to the specific sequence.

The main purpose and effect of the present disclosure is that the power supply equipment can communicate with each other by the system controller and the control modules of each power supply to arrange a specific sequence for each power supply so as to stagger the operating frequencies of the power supplies according to the specific sequence to avoid multiple power supplies all operating at the same frequency, causing the total noises to be superimposed at the same frequency point, thereby reducing the accumulation of noise at the system level and provide better suppression of electromagnetic interference.

It is to be understood that both the foregoing general description and the following detailed description are exemplary, and are intended to provide further explanation of the present disclosure as claimed. Other advantages and features of the present disclosure will be apparent from the following description, drawings, and claims.

BRIEF DESCRIPTION OF DRAWINGS

The present disclosure can be more fully understood by reading the following detailed description of the embodiment, with reference made to the accompanying drawing as follows:

FIG. 11 is a flowchart of a method of operating the power supply equipment according to the present disclosure.

DETAILED DESCRIPTION

Figure 1:
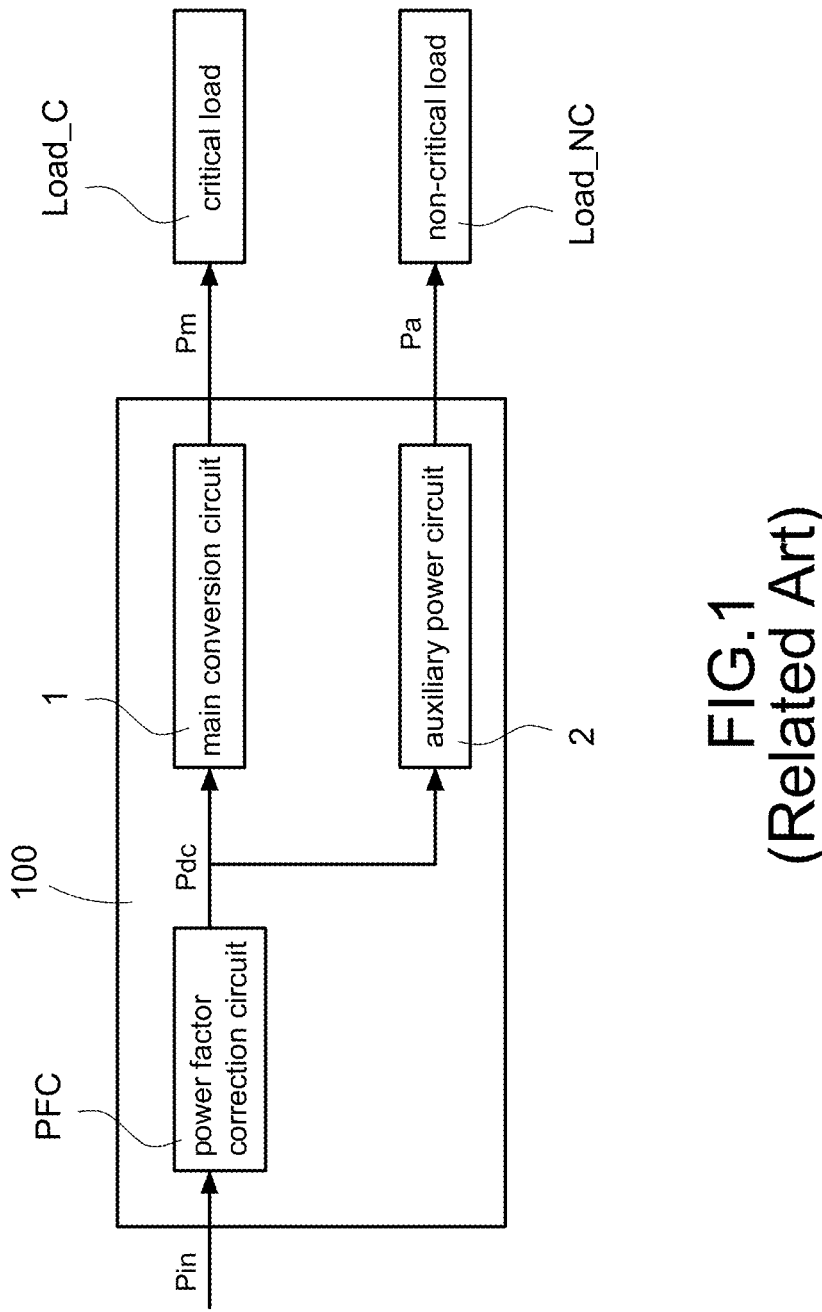
FIG. 1 is a block circuit diagram of a related-art power supply.

Reference will now be made to the drawing figures to describe the present disclosure in detail. It will be understood that the drawing figures and exemplified embodiments of present disclosure are not limited to the details thereof.

The first technical solution: load allocation mechanism.

Figure 2A:
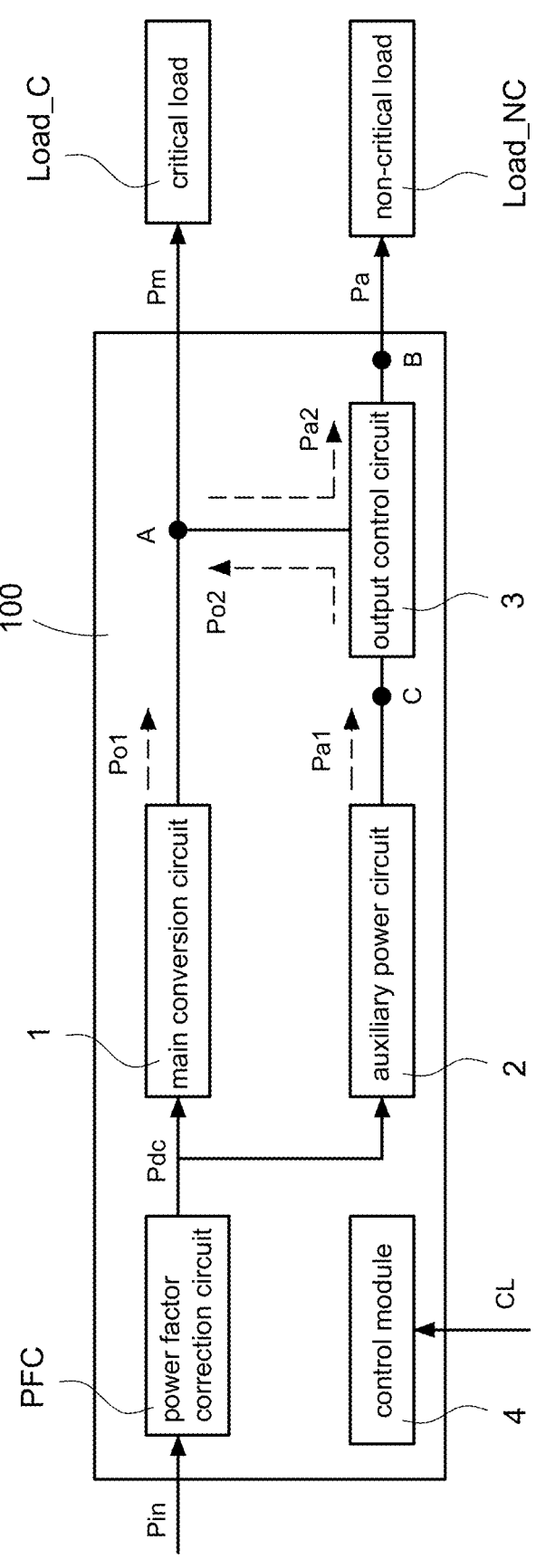
FIG. 2A is a block circuit diagram of a power supply according to a first embodiment of the present disclosure.

Please refer to FIG. 2A, which shows a block circuit diagram of a power supply according to a first embodiment of the present disclosure, and also refer to FIG. 1. The power supply 100 includes a power factor correction circuit PFC, a main conversion circuit 1 (hereinafter abbreviated as "conversion circuit 1"), an auxiliary power circuit 2, an output control circuit 3, and a control module 4. The power factor correction circuit PFC is coupled to an input terminal of the conversion circuit 1 and an input terminal of the auxiliary power circuit 2. Moreover, the power supply 100 includes a first output terminal A, a second output terminal B, and a third output terminal C, and an output terminal of the conversion circuit 1 is the first output terminal A. The first output terminal A is coupled to one terminal of the output control circuit 3, and the first output terminal A is mainly used to couple to a critical load Load_C. Another terminal of the output control circuit 3 is the second output terminal B, and the second output terminal B is mainly used to couple to a non-critical load Load_NC. An output terminal in of the auxiliary power circuit 2 is the third output terminal C, and the third output terminal Cis coupled to the output control circuit 3. In one embodiment, the conversion circuit 1 may be, for example but not limited to, a resonant converter (such as but not limited to LLC, CLLC and other converters with resonant functions), and the auxiliary power circuit 2 may be, for example but not limited to, a flyback converter, but it is not limited to this. All converters that are suitable and commonly used in the power supply 100 should be included in the scope of this embodiment.

The control module 4 receives a control command CL provided by a system controller, the critical load Load_C, and/or the non-critical load Load_NC, and other devices so as to control the power factor correction circuit PFC, the conversion circuit 1, the auxiliary power circuit 2, and the output control circuit 3 so that the power supply 100 can supply power to the critical load Load_C and the non-critical load Load_NC. Specifically, the power factor correction circuit PFC is mainly used to convert the AC input power Pin into the DC power Pdc, and perform a power factor correction on the input power Pin. The conversion circuit 1 converts the DC power Pdc into a main output power (hereinafter referred as "first output power Po1"), and provides the first output power Po1 to supply power to the critical load Load_C through the first output terminal A. The auxiliary power circuit 2 converts the DC power Pdc into an auxiliary power (hereinafter referred as "first auxiliary power Pa1"), and provides the first auxiliary power Pa1 to the third output terminal C.

In one embodiment, in addition to controlling the power supply 100 according to the control command CL, the control module 4 can also receive signals (for example, but not limited to feedback signals related to voltage and current, etc.) provided by the power factor correction circuit PFC, the conversion circuit 1, the auxiliary power circuit 2, and the output control circuit 3 to control the power supply 100. Moreover, the control module 4 may include one or more controllers. For example, but not limited to, the power factor correction circuit PFC, the conversion circuit 1, the auxiliary power circuit 2, and the output control circuit 3 are each controlled by a controller, and these controllers are combined with circuits such as, but not limited to, detection and compensation to form the control module 4. Alternatively, the control module 4 includes a single controller, and controls the power factor correction circuit PFC, the conversion circuit 1, the auxiliary power circuit 2, and the output control circuit 3 through this single controller. In one embodiment, various detection, determination, and control of the power supply 100 can be implemented by the control module 4. However, in order to avoid obscuring the main features of this disclosure, unless the implementers of detection, determination, and control are specifically specified in the text, the implementers of various detection, determination, and control in the following text will be attributed to the control module 4.

Moreover, the conversion circuit 1 can output a power of, for example, but not limited to, up to 250 W, and the auxiliary power circuit 2 can output a power of, for example, but not limited to, 36 W. However, under normal circumstances, due to the need for high stability and a wide operating range of the auxiliary power circuit 2 (such as but not limited to 3.3V, 5V, 12V), its optimal efficiency operating point is usually not under normal working conditions, causing the efficiency of the auxiliary power circuit 2 to be unable to be effectively improved. Therefore, the maximum achievable efficiency of auxiliary power circuit 2 (for example, but not limited to, below 92%) is often worse than that of the conversion circuit 1 (for example, but not limited to, 98%), and the efficiency difference between the two is usually above 5%. In one embodiment, unless otherwise specified in this article, the "power supply" can be equivalently regarded as "power", and its relationship with voltage and current can be inferred based on basic electrical principles.

The main feature of the present disclosure is that the conversion circuit 1 and the auxiliary power circuit 2 can allocate the power provided to the critical load Load_C and the non-critical load Load_NC through the operation of the output control circuit 3. Specifically, the output control circuit 3 is mainly used to selectively connect the first output terminal A and the second output terminal B, that is, the output control circuit 3 electrically connects the first output terminal A and the second output terminal B in a selective manner. Therefore, the power supply 100 can output the first output power Po1 provided by the conversion circuit 1 to supply power to the critical load Load_C through the first output terminal A when the control circuit 3 disconnects the first output terminal A and the second output terminal B. Moreover, the power supply 100 can output the first output power Po1 provided by the conversion circuit 1 to supply power to the critical load Load_C and the non-critical load Load_NC through the first output terminal A and the second output terminal B respectively when the control circuit 3 connects the first output terminal A and the second output terminal B. Accordingly, the loads of the conversion circuit 1 and the auxiliary power circuit 2 can be allocated to increase the efficiency of the power supply 100 as much as possible.

1. High Efficiency Output Mode of the Power Supply

In practice, since the auxiliary power circuit 2 requires a wider range and more stringent working conditions, in order to achieve the efficiency of 92% in the example, the auxiliary power circuit 2 still needs to use quite complex circuits. Please refer to Table 1 below for the efficiency/power parameter table of the conversion circuit 1 and the auxiliary power circuit 2 respectively supplying power to the non-critical load Load_NC. In Table 1, it is assumed that the auxiliary power circuit 2 can output power of 36 W and the operating efficiency is 92%, and it is assumed that the operating efficiency of the conversion circuit 1 is 98%. Calculated based on the above conditions, the corresponding power loss of the load of auxiliary power circuit 2 at half load will reach 19.565 W. On the contrary, if this load is transferred to the conversion circuit 1 with higher efficiency, the power loss will be only 18.367 W. Therefore, the power loss difference between the two is 1.197 W, and the power loss difference of 1.197 W will improve the overall efficiency by 0.479%. Therefore, in order to improve the efficiency of the single power supply 100, the present disclosure further transfers the loading of the auxiliary power circuit 2 to the conversion circuit 1 with high-efficiency through the control of the output control circuit 3 so as to reduce the loop loss of the power supply 100, thereby increasing the power density and the efficiency.

TABLE 1

| efficiency/power parameters of the conversion circuit and the auxiliary power circuit respectively for supplying power the non-critical load | | | |
|---|---|---|---|
| | required output power (full load/ half load) | efficiency | input power converted according to efficiency | loss efficiency difference/ improvement rate |
| conversion circuit supplying power to the non-critical load | 36 W/18 W | 98% | 18.367 W | 1.197 W/0.479% |
| auxiliary power circuit supplying power to the non-critical load | 36 W/18 W | 92% | 19.565 W | |

Specifically, the power supply 100 can provide a second auxiliary power Pa2 to the second output terminal B through a path from the first output terminal A to the second output terminal B by connecting the first output terminal A and the second output terminal B by the output control circuit 3 when the conversion circuit 1 operates normally and the first output power Po1 still has margin. Therefore, the non-critical load Load_NC may be supplied power by the second auxiliary power Pa2, and the loading of the auxiliary power circuit 2 can be transferred to the conversion circuit 1 with high-efficiency conversion circuit 1 by the control of the output control circuit 3. Therefore, the power supply 100 can provide load allocation capability by high-efficient output operation, thereby increasing the efficiency of the power supply 100. Moreover, since the auxiliary power circuit 2 is not the main load bearer at this time, the control module 4 may adjust the auxiliary power circuit 2 to standby, sleep, or temporarily turn off based on the consideration of saving power consumption, and when the auxiliary power circuit 2 is required to supply power, it will be restored to normal operation. On the contrary, when the conversion circuit 1 normally operates but the first output power Po1 has no margin (for example, but is not limited to full load), the output control circuit 3 connects the second output terminal B and the output terminal of the auxiliary power circuit 2 (i.e., the second output terminal B), and therefore the auxiliary power circuit 2 provides the first auxiliary power Pa1 to the second output terminal B through the output control circuit 3 so that the non-critical load Load_NC can be supplied power by the first auxiliary power Pa1.

In one embodiment, the "margin" is not just the power difference between the current first output power Po1 (i.e., the current output power) and the full load power. Specifically, since the critical load Load_C is usually the main controller of the entire system, its power demand is usually more important and its demand should be met as immediately as possible. Therefore, when the critical load Load_C instantly increases the loading to full load, the power supply 100 should have the ability to temporarily meet its demand. However, if the upper limit of the "margin" is set at full load, the power for supplying the non-critical load Load_NC may not be quickly switched/transferred to be supplied by the auxiliary power circuit 2. Therefore, the control module 4 may preferably set the margin to the full load power minus a specific value, and the specific value is a value that can temporarily increase the loading to full load in response to the critical load Load_C, thereby assuming that the full-load output power of the conversion circuit 1 is 250 W, and the specific value may be set to, for example but not limited to, 10 W.

2. Hold-Up Time Extension Mode

In addition to the above-mentioned control manners, the power supply 100 of the present disclosure may also include other control manners to provide additional functions. Specifically, the power supply 100 can also activate the output control circuit 3 to connect the first output terminal A and the second output terminal B when the first output power Po1 is not within a predetermined range so that the auxiliary power circuit 2 provides the second output power Po2 to the first output terminal A through the second output terminal B to the first output terminal A of the output control circuit 3, and temporarily supplement the output capacitor of the conversion circuit 1 (not shown in the figure) with extra power, and thereby extending the hold-up time of the conversion circuit 1. Therefore, the hold-up time of the conversion circuit 1 can be extended to allow the back-end critical load Load_C sufficient time to respond, thereby avoiding the loss of important data. Afterward, when the control module 4 determines that the hold-up time is reached, it means that the critical load Load_C has completed the preparatory action before shutting down. Therefore, the output control circuit 3 can disconnect the first output terminal A and the second output terminal B so as to no longer provide the second output power Po2 to the first output terminal A. In particular, the reasons why the first output power Po1 is not within the predetermined range include, but are not limited to, the conversion circuit 1 enters over-voltage, over-current, and low-voltage protection, or the conversion circuit 1 fails and enters sleep, standby, or shutdown states.

Moreover, when the power supply 100 is powered off, the auxiliary power circuit 2 also has no power supply, thereby causing it enters a state of preparing to power off. At this time, if there is still a margin for the energy that the auxiliary power circuit 2 can provide, the output control circuit 3 connects the first output terminal A and the second output terminal B to also increase the hold-up time of the conversion circuit 1. On the contrary, the conversion circuit 1 and the auxiliary power circuit 2 each use their own remaining power to try to extend their own hold-up time. At this time, the output control circuit 3 disconnects the first output terminal A and the second output terminal B so that the power supply 100 performs this operation.

In conclusion, the power supply 100 of the present disclosure can selectively control the output control circuit 3 to connect the first output terminal A and the second output terminal B according to the energy margin provided by the auxiliary power circuit 2 to meet the ITIC (information technology industry council) AC input voltage waveform (AC input voltage envelope) specification under the control of the hold-up time.

3. Peak Power Mode

In addition, the power supply 100 also operates in a peak power mode. In order to increase the efficiency of the standby power supply of the single power supply 100 and also increase the specification of the peak power, when the first output power Po1 fails to respond to the power demand of the critical load Load_C (for example, the full load of the conversion circuit 1 is 250 W, but the critical load Load_C requires a power output of 260 W), the output control circuit 3 connects the first output terminal A and the second output terminal B so that the auxiliary power circuit 2 provides the second output power Po2 to the first output terminal A through the second output terminal B of the output control circuit 3 to the first output terminal A, that is, the auxiliary power circuit 2 provides the remaining 10 W. Therefore, the first output power Po1 and the second output power Po2 can jointly supply power to the critical load Load_C to provide overload power supply (peak power).

Moreover, when the first output power Po1 fails to respond to the power demand of the critical load Load_C and the energy margin of the second output power Po2 is not enough to meet, the control module 4 can notify the critical load Load_C (such as but not limited to a central processing unit and other processing devices) through the systematic deployment whether the power consumption of the non-critical load Load_NC can be reduced by shutting down or lowering the frequency to temporarily release additional power to provide the critical load Load_C. For example, it is assumed that the full load of the conversion circuit 1 is 250 W but the critical load Load_C requires a power output of 265 W. When the current auxiliary power circuit 2 may only provide a power output of 12 W, the control module 4 can notify the critical load Load_C (such as but not limited to a central processing unit and other processing devices) through the systematic deployment whether the power consumption (i.e., 3 W) of the non-critical load Load_NC can be reduced by shutting down or lowering the frequency. When the power consumption of the non-critical load Load_NC is reduced by 3 W, the auxiliary power circuit 2 can provide additional second output power Po2 (i.e., 12 W+3 W) to the first output terminal A through the second output terminal B of the output control circuit 3 to the first output terminal A so as to meet the requirements of the critical load Load_C.

Similarly, when the first output power Po1 supplies power to the non-critical load Load_NC, but the margin of the first output power Po1 is insufficient, the conversion circuit 1 and the auxiliary power circuit 2 can jointly supply power to the non-critical load Load_NC. Specifically, the power supply 100 can supply power to the non-critical load Load_NC. However, when the margin of the first output power Po1 is insufficient (for example, the non-critical load Load_NC requires a power output of 36 W, but the margin of the first output power Po1 is only 20 W), the output control circuit 3 connects the first output terminal A and the second output terminal B so that the auxiliary power circuit 2 provides the first auxiliary power Pa1 to the second output terminal B through the third output terminal C to the second output terminal B, that is, the auxiliary power circuit 2 provides the remaining 16 W. Therefore, the first output power Po1 and the second output power Po2 can jointly supply power to the non-critical load Load_NC.

Figure 2B:
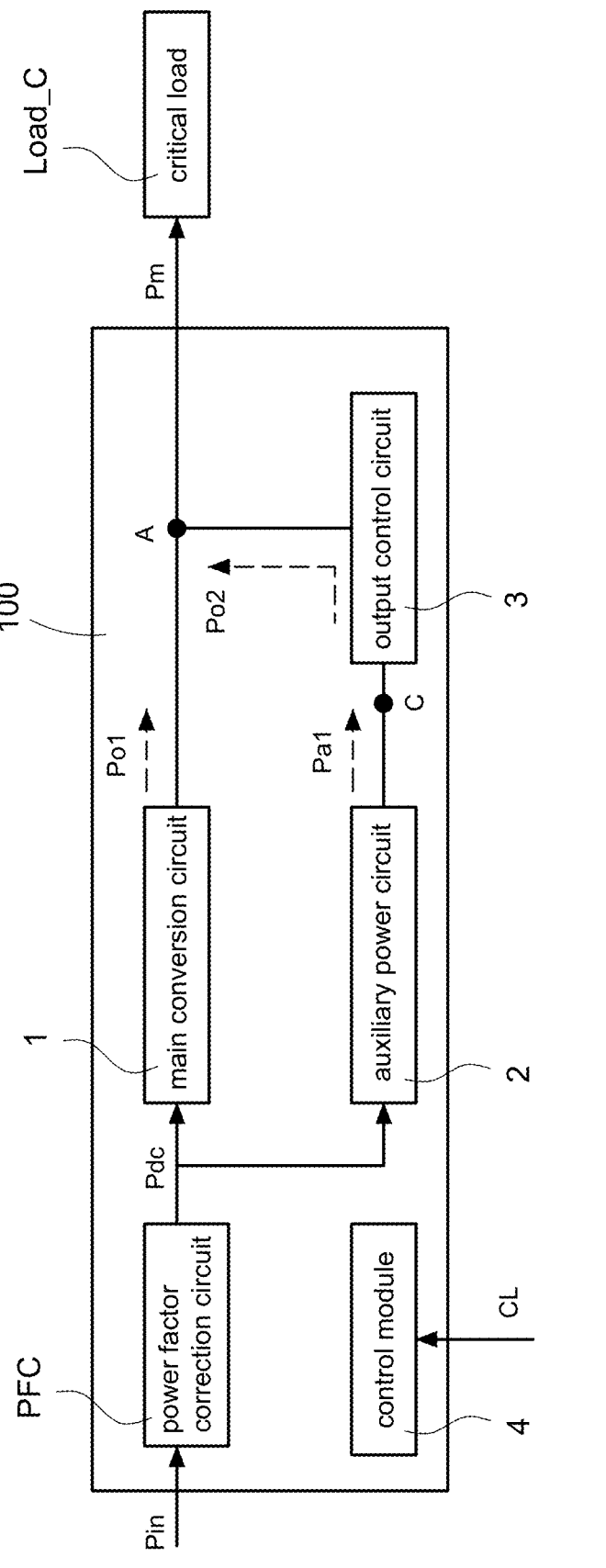
FIG. 2B is a block circuit diagram of the power supply according to a second embodiment of the present disclosure.

Please refer to FIG. 2B, which shows a block circuit diagram of the power supply according to a second embodiment of the present disclosure, and also refer to FIG. 2A. The difference between the power supply 100 of FIG. 2B and the power supply 100 of FIG. 2A is that the power supply 100 of FIG. 2B is not coupled to the non-critical load Load_NC. Therefore, the output control circuit 3 is coupled to the first output terminal A, and coupled to the auxiliary power circuit 2 through the third output terminal C. Under this circuit structure, the power supply 100 can still provide the above-mentioned hold-up time extension mode and peak power mode. Specifically, regardless of the hold-time extension mode or the peak power mode, since the main reason is that the first output terminal A has a backup requirement (that is, requires additional power), when the first output terminal A has a backup requirement, the output control circuit 3 connects the first output terminal A and the auxiliary power circuit 2. Therefore, the first auxiliary power Pa1 provided by the auxiliary power circuit 2 can be provided to the first output terminal A through the output control circuit 3 to meet the backup requirement of the first output terminal A. In one embodiment, the hold-up extension time mode or the peak power mode that can be implemented in FIG. 2B is similar to 2 (Hold-up time extension mode) to 3 (Peak power mode) described above, and will not be described again here. In one embodiment, although not specifically described, the circuit structure of FIG. 2B can be applied to any situation where the first output terminal A has a redundancy requirement as described above or below in the present disclosure, and will not be described again here.

Figure 3A:
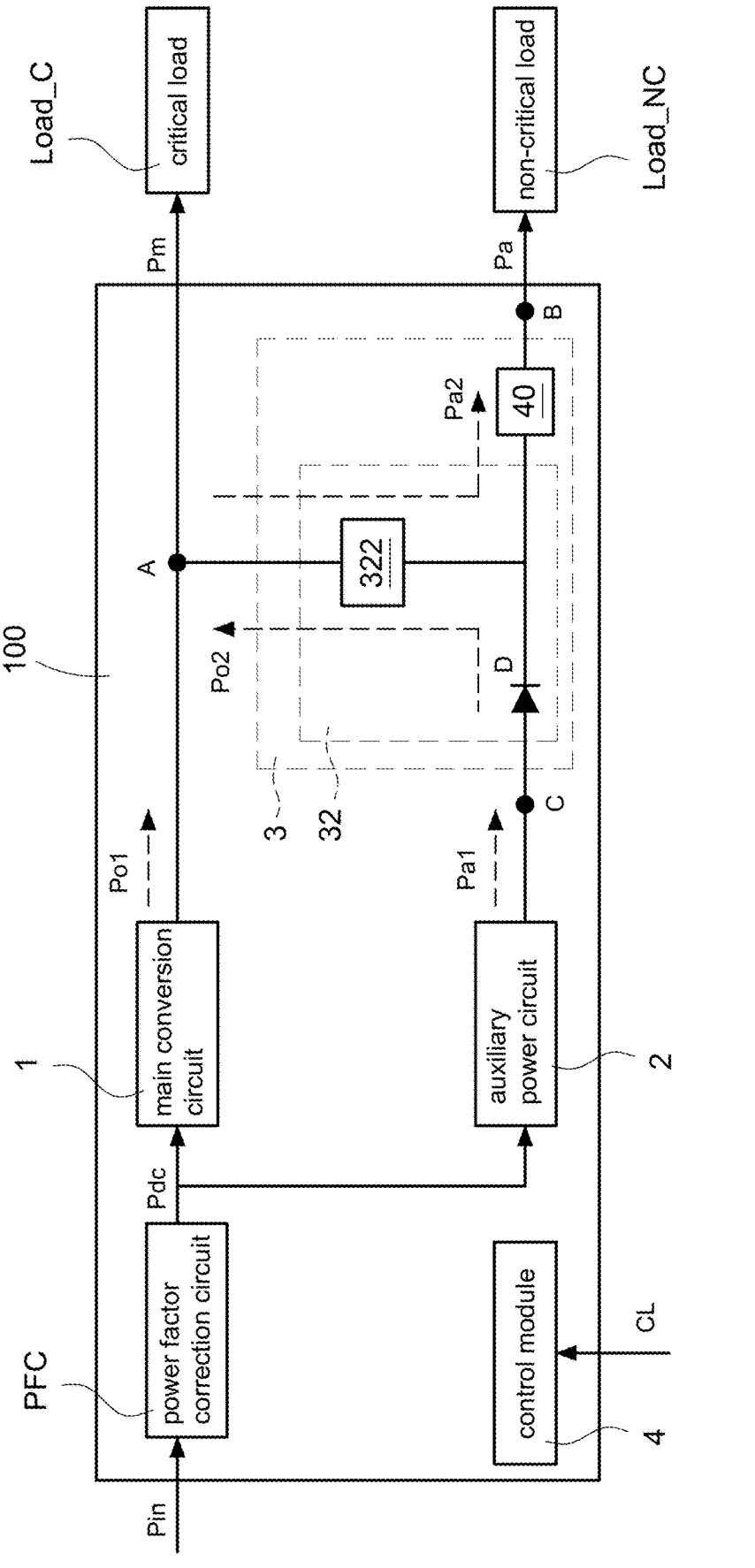
FIG. 3A is a block circuit diagram of an output control circuit according to a first embodiment of the present disclosure.

Please refer to FIG. 3A, which shows a block circuit diagram of an output control circuit according to a first embodiment of the present disclosure, and also refer to FIG. 2A and FIG. 2B. In FIG. 3A, the output control circuit 3 includes a switch circuit 32, and the switch circuit 32 is coupled to the first output terminal A, the second output terminal B, and the third output terminal C respectively. The circuit switch 32 includes a switch 322 and a unidirectional conduction component D, and a control terminal of the switch 322 is coupled to the control module 4. For example, but not limited to, the switch 322 may be a semiconductor component such as a transistor, and the control module 4 may selectively turn on and turn off the switch 322 according to the above-mentioned control requirements of the power supply 100 to connect or disconnect the first output terminal A and the second output terminal B. A first terminal of the switch 322 is coupled to the first output terminal A, and a second terminal of the switch 322 is coupled to the second output terminal B and a first terminal of the unidirectional conduction component D. A second terminal of the unidirectional conduction component D is coupled to the auxiliary power circuit 2 through the third output terminal C. In particular, the unidirectional conduction component D may be, for example, but not limited to, a diode, a thyristor, etc., which is forward biased in one direction (i.e., the direction from the third output terminal C to the second output terminal B is forward bias). However, the component with reverse bias in the opposite direction, or the unidirectional conduction component D, may also be a switch, so as to be controlled to conduct to connect the second output terminal B and the third output terminal C when necessary.

Moreover, when the control module 4 turns on the switch 322, the first output power Po1 may be as the second auxiliary power Pa2, which is then provided to the second output terminal B, or the first auxiliary power Pa1 may be as the second output power Po2, which is then provided to the first output terminal A (depending on the operation mode described in FIG. 2A above). On the contrary, when the control module 4 turns off the switch 322, the first output power Po1 and the first auxiliary power Pa1 are provided to the critical load Load_C, and the first auxiliary power Pa1 is provided to the non-critical load Load_NC so that the critical load Load_C and the non-critical load Load_NC are supplied power. In particular, when the control module 4 controls on the switch 322, the first auxiliary power Pa1 may be provided to the second output terminal B through the unidirectional conduction component D, but the second auxiliary power Pa2 cannot be flowed back into the auxiliary power circuit 2 through the unidirectional conduction component D. Therefore, the auxiliary power circuit 2 can be prevented from accidentally receiving an inappropriate voltage, and the backflow protection function of the second auxiliary power Pa2 can be provided to prevent the auxiliary power circuit 2 from failing due to the backflow.

In one embodiment, the switch 322 may be a controlled switch or a self-driven switch. Specifically, when the switch

322 is a controlled switch, the switch 322 may, for example, but not limited to, actively detect the status and voltage/current of the conversion circuit 1 to determine whether to self-conduct and connect the first output terminal A and the second output terminal B, alternatively controlled through external control (such as but not limited to the system controller, the controller of the conversion circuit 1, etc.). When the switch 322 is a self-driven switch, the switch 322 may be turned on by itself through voltage/current changes at each terminal to connect the first output terminal A and the second output terminal B. Therefore, as long as the circuit components, circuits, controllers, etc. can achieve the on/off function, they should be included in the scope of this embodiment.

Moreover, the output control circuit 3 further includes a protection switch 40. In general, the auxiliary power circuit 2 includes an isolation switch directly coupled to its output terminal; however, the present disclosure does not permit such a configuration. The protection switch 40 is coupled to the second output terminal B, and is mainly used to determine whether the power supply (i.e., the first auxiliary power Pa1 and/or the second auxiliary power Pa2) can be provided to the non-critical load Load_NC by controlling the turning on and turning off of the protection switch 40. When the power supply (i.e., the first auxiliary power Pa1 and/or the second auxiliary power Pa2) is not within the predetermined range, the protection switch 40 is turned off to disconnect its path to avoid non-compliant first auxiliary power Pa1 and/or second auxiliary power Pa2 being provided to the non-critical load Load_NC and causing damage to the non-critical load Load_NC. On the contrary, the output protection switch 40 is turned on to connect its path so as to provide the compliant first auxiliary power Pa1 and/or the second auxiliary power Pa2 to the non-critical load Load_NC to supply power the non-critical load Load_NC.

Figure 3B:
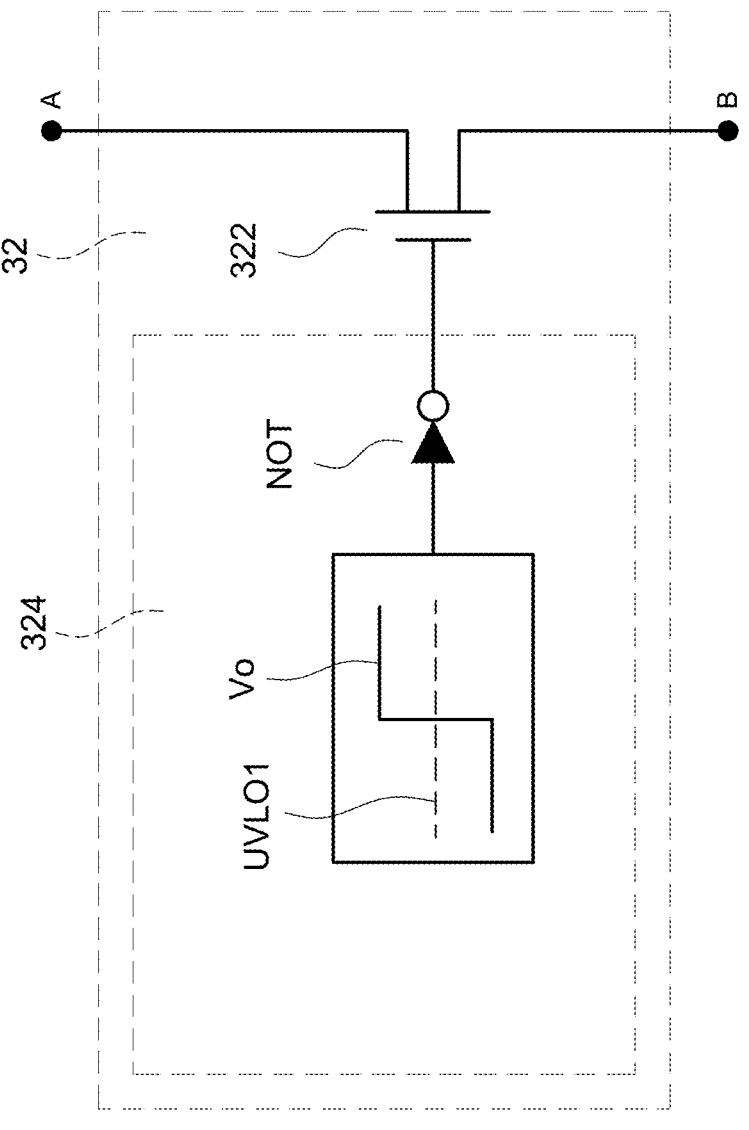
FIG. 3B is a block circuit diagram of a switch circuit according to a first embodiment of the present disclosure.

Please refer to FIG. 3B, which shows a block circuit diagram of a switch circuit according to a first embodiment of the present disclosure, and also refer to FIG. 2A to FIG. 3A. In FIG. 3B, the switch circuit 32 applies the undervoltage lockout value UVLO1 of the conversion circuit 1 as the operating logic. The switch circuit 32 includes a switch 322 and a control circuit 324. In one embodiment, the switch 322 may be a PMOS transistor. The control circuit 324 is coupled to a control terminal of the switch 322 and an output terminal of the conversion circuit 1. When the output voltage Vo at the output terminal of the conversion circuit 1 is higher than the undervoltage lockout value UVLO1, it means that the conversion circuit 1 normally operates. Therefore, the control circuit 324 determines that the output voltage Vo of the conversion circuit 1 is higher than the undervoltage lockout value UVLO1, and inverts its signal through a not (inverted) gate NOT to turn on the switch 322. On the contrary, when the control circuit 324 determines that the output voltage Vo is lower than the undervoltage lockout value UVLO1, its signal is inverted through the not gate NOT so that the control circuit 324 controls off the switch 322.

Figure 3C:
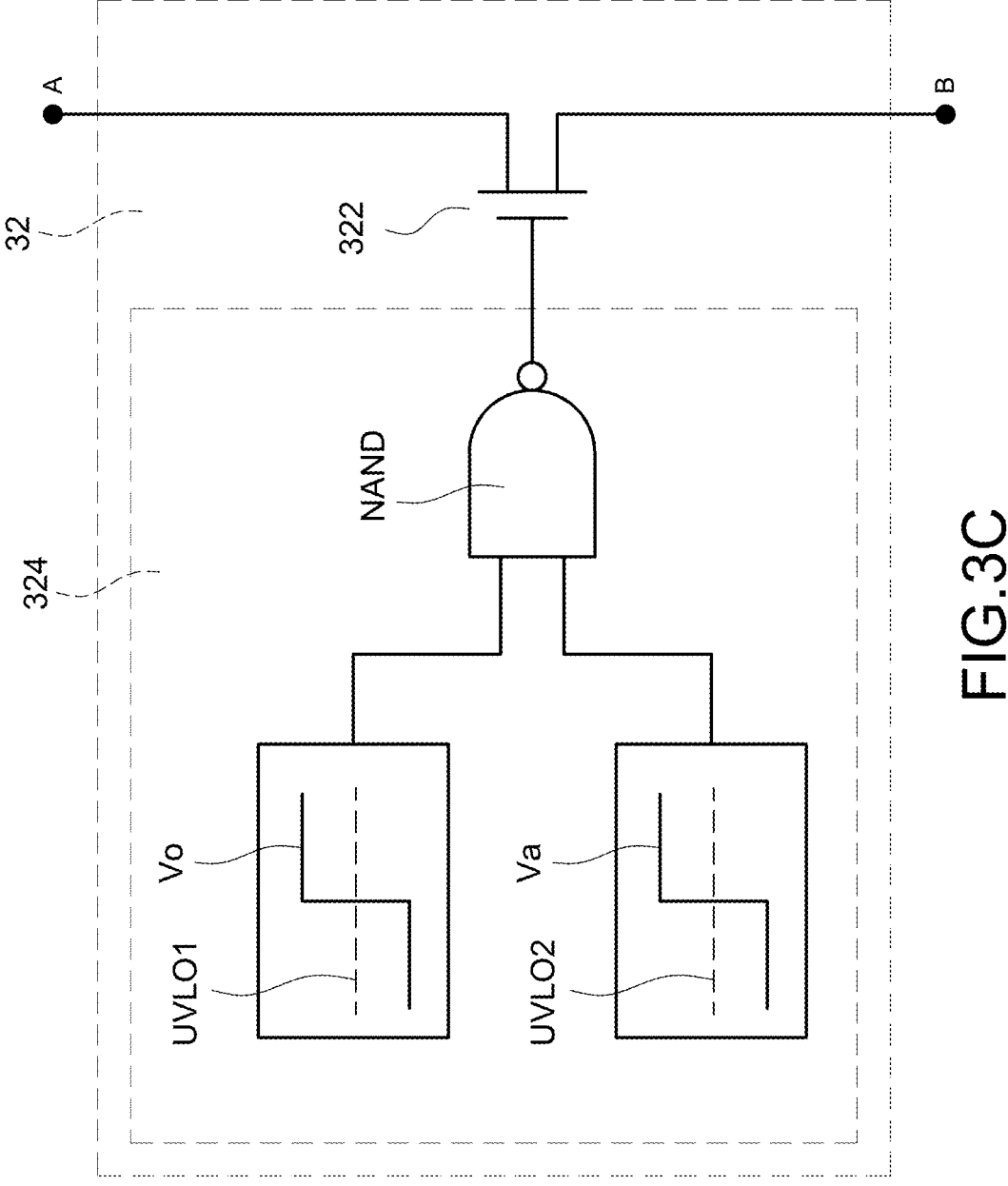
FIG. 3C is a block circuit diagram of a switch circuit according to a second embodiment of the present disclosure.

Please refer FIG. 3C, which shows a block circuit diagram of a switch circuit according to a second embodiment of the present disclosure, and also refer to FIG. 2A to FIG. 3B. In FIG. 3C, in addition to using the undervoltage lockout value UVLO1 of the conversion circuit 1 as the operating logic, the switch circuit 32 also uses the undervoltage lockout value UVLO2 of the auxiliary power circuit 2 as a supplementary operation to control the switch 322 more stably and accurately. When the output voltage Vo at the output terminal of the conversion circuit 1 is higher than the undervoltage lockout value UVLO1, it means that the conversion circuit 1 normally operates, and when the auxiliary voltage Va at the output terminal of the auxiliary power circuit 2 is higher than the undervoltage lockout value UVLO2, it means the auxiliary power circuit 2 normally operates. Therefore, both of them provide a logic signal with logic 1, and the logic signal is inverted through the NAND gate so that the control circuit 324 turns on the control the switch 322. On the contrary, when the control circuit 324 determines that the output voltage Vo or the auxiliary voltage Va is lower than the undervoltage lockout values UVLO1, UVLO2, the signal is reversed through the NAND gate so that the control circuit 324 turns off the switch 322. In one embodiment, the circuit blocks, structures and couplings of the switch circuit 32 in FIG. 3B to 3C are only preferred embodiments in many implementations. In fact, it can be determined according to the detailed operation mode of the switch circuit 32, the circuit block, structure, and coupling relationship of the switch circuit 32. In practice, the circuit block, structure, and coupling relationship of the switch circuit 32 may be based on the detailed operation of the switch circuit 32. Therefore, as long as the switch circuit 32 can control the on/off of the switch 322 according to the above operation logic so that the power supply 100 provides the above functions, it should be included in the scope of this embodiment.

Figure 4A:
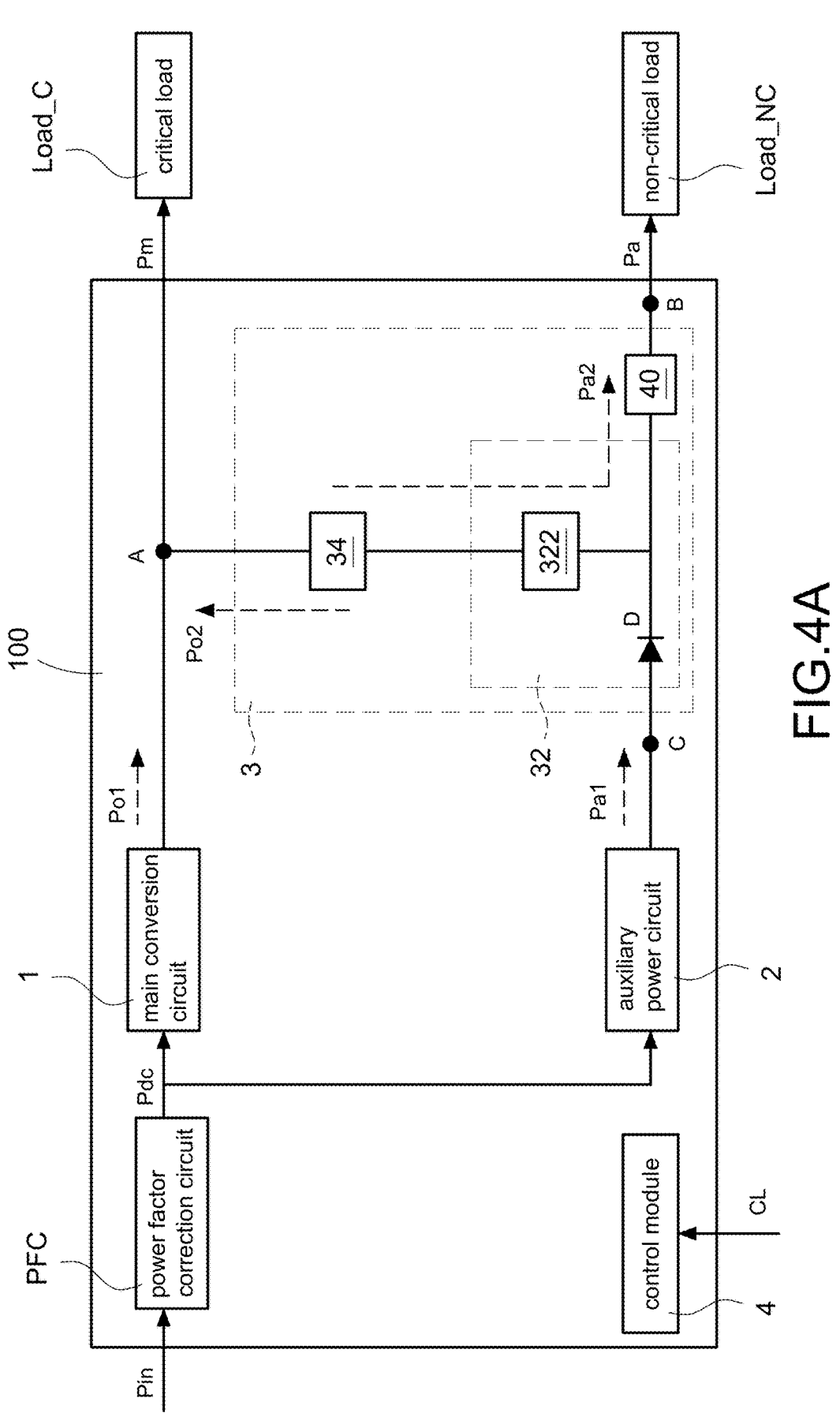
FIG. 4A is a block circuit diagram of the output control circuit according to a second embodiment of the present disclosure.

Please refer to FIG. 4A, which shows a block circuit diagram of the output control circuit according to a second embodiment of the present disclosure, and also refer to FIG. 2A to FIG. 3B. The difference between FIG. 4A and FIG. 3A is that the output control circuit 3 of FIG. 4A further includes a DC conversion circuit 34. A first terminal of the DC conversion circuit 34 is coupled to the output terminal of the conversion circuit 1 and the first output terminal A, and a second terminal of the DC conversion circuit 34 is coupled to the switch circuit 32. The DC conversion circuit 34 is mainly used to convert the first output power Po1 into the second auxiliary power Pa2 so that the conversion circuit 1 supplies power to the non-critical load Load_NC. Furthermore, since the output voltage Vo of the first output power Po1 may be higher or lower than the auxiliary voltage Va of the first auxiliary power Pa1 (for a general power supply 100, the output voltage Vo is usually higher than the auxiliary voltage Va), if it is directly used as the second auxiliary power Pa2, the voltage level of the output voltage Vo of the first output power Po1 cannot meet the requirements of the non-critical load Load_NC. Therefore, when the conversion circuit 1 supplies power to the non-critical load Load_NC and the output voltage Vo does not match the auxiliary voltage Va, the DC conversion circuit 34 can convert the output voltage Vo into the auxiliary voltage Va to provide the second auxiliary power Pa2 whose voltage level meets the requirements of the non-critical load Load_NC.

Moreover, the DC conversion circuit 34 may be a bidirectional DC converter so that the power supply 100 is provided with the capability of supplying power to the critical load Load_C through the auxiliary power circuit 2. Specifically, when the DC conversion circuit 34 is a bidirectional DC converter, the DC conversion circuit 34 may be used to convert the first auxiliary power Pa1 into the second output power Po2 so that the auxiliary conversion circuit 2 supplies power to the critical load Load_C. Taking the specific operation mode of the power supply 100 in FIG. 2A as an example, when the first output power Po1 is not within the predetermined range or the first output power Po1 fails to respond to the power demand of the critical load Load_C, the switch circuit 32 connects the DC conversion circuit 34 and the second output terminal B, and the DC conversion circuit 34 converts the first auxiliary power Pa1 into the second output power Po2 to provide the second output power Po2 to the first output terminal A. When the auxiliary power circuit 2 supplies power to the critical load Load_C and the output voltage Vo does not match the auxiliary voltage Va, the DC conversion circuit 34 can convert the auxiliary voltage Va into the output voltage Vo to provide the second output power Po2 whose voltage level meets the requirements of the critical load Load_C. In particular, in order to step up/down the output voltage Vo and the auxiliary voltage Va, the DC conversion circuit 34 may be a boost converter, a buck converter, or a buck-boost converter, mainly depending on the requirements of the power supply 100.

Figure 4B:
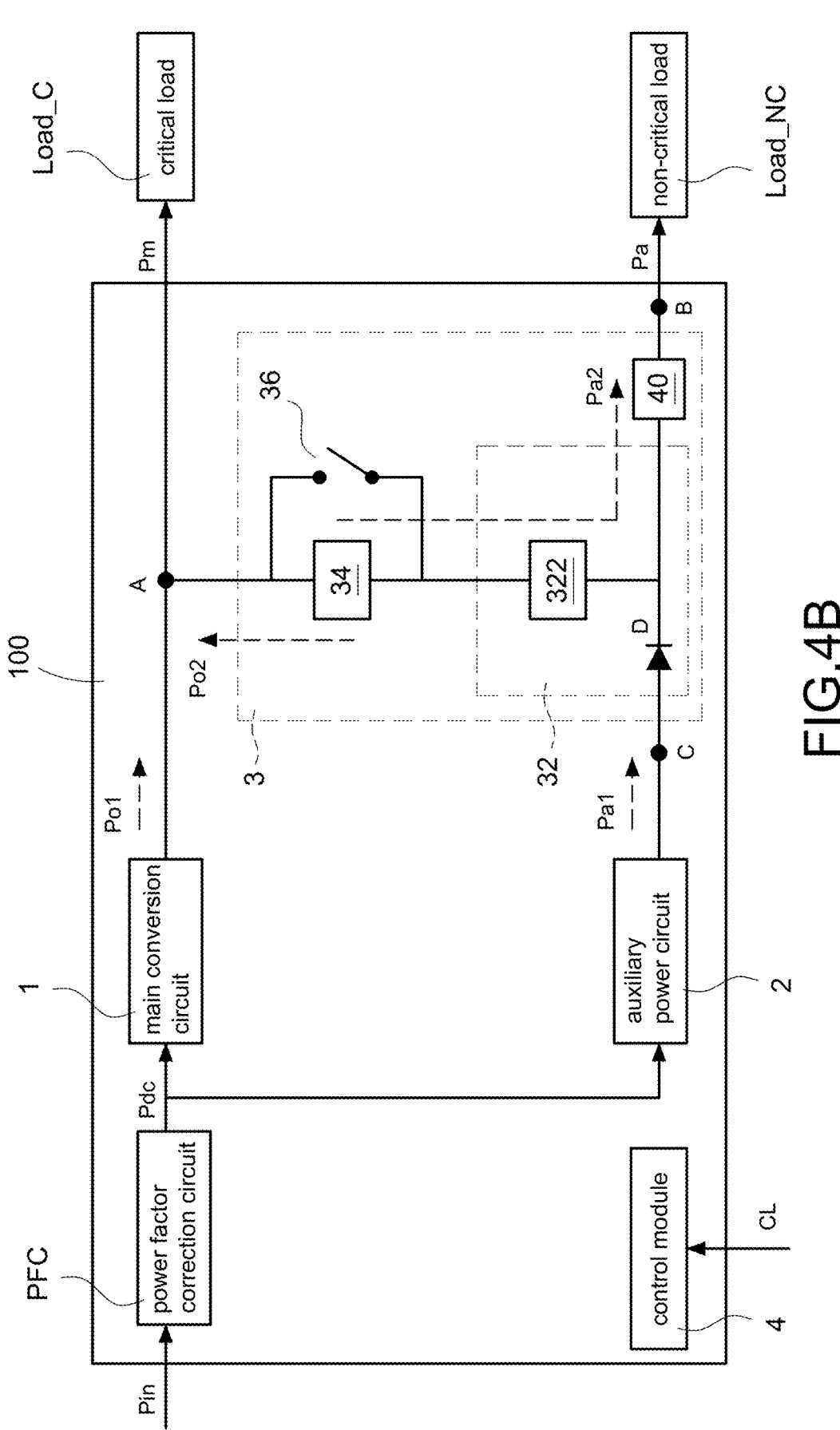
FIG. 4B is a block circuit diagram of the output control circuit according to a third embodiment of the present disclosure.

Please refer to FIG. 4B, which shows a block circuit diagram of the output control circuit according to a third embodiment of the present disclosure, and also refer to FIG. 2A to FIG. 4A. The difference between FIG. 4B and FIG. 4A is that the output control circuit 3 of FIG. 4B further includes a bypass switch 36. The bypass switch 36 is connected in parallel with the DC conversion circuit 34 to provide power saving operation when the output voltage Vo matches the auxiliary voltage Va. Specifically, when the output voltage Vo provided by the conversion circuit 1 does not match the auxiliary voltage Va provided by the auxiliary power circuit 2, and the conversion circuit 1 wants to provide the first output power Po1 to the second output terminal B, the bypass switch 36 is turned off so that the DC conversion circuit 34 converts the first output power Po1 into the second auxiliary power Pa2. Moreover, under the DC conversion circuit 34 being a bidirectional DC converter, when the output voltage Vo does not match the auxiliary voltage Va, and the auxiliary power circuit 2 wants to provide the first auxiliary power Pa1 to the first output terminal A, the bypass switch 36 is turned off so that the DC conversion circuit 34 converts the first auxiliary power Pa1 into the second output power Po2.

On the contrary, when the output voltage Vo is equal to the auxiliary voltage Va, the bypass switch 36 is turned on, and the first output power Po1 is as the second auxiliary power Pa2 and is provided to the second output terminal B through the bypass switch 36. Moreover, when the auxiliary power circuit 2 wants to provide the first auxiliary power Pa1 to the first output terminal A, the first auxiliary power Pa1 may be as the second output power Po2 and is provided to the first output terminal A through the bypass switch 36. Therefore, the power loss of the DC conversion circuit 34 can be saved, thereby increasing the efficiency of the power supply 100. Moreover, when the DC conversion circuit 34 is not operating, the power supply 100 can selectively control the DC conversion circuit 34 to standby, sleep, or even disable the DC conversion circuit 34 to completely stop operating.

Figure 4C:
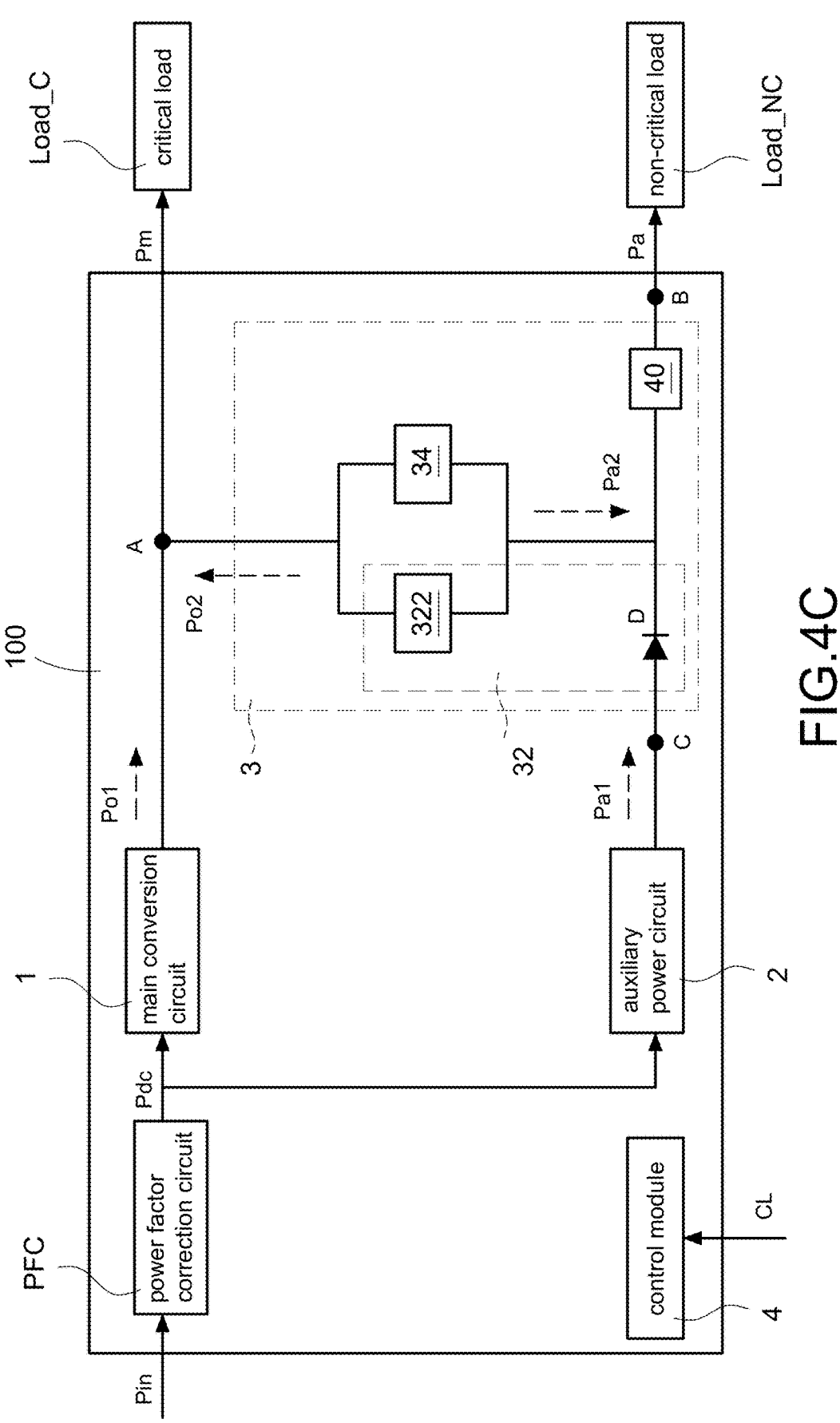
FIG. 4C is a block circuit diagram of the output control circuit according to a fourth embodiment of the present disclosure.

Please refer to FIG. 4C, which shows a block circuit diagram of the output control circuit according to a fourth embodiment of the present disclosure, and also refer to FIG. 2A to FIG. 4B. The difference between FIG. 4C and FIG. 4A is that the coupling relationship between the DC conversion circuit 34 and the switch circuit 32 in FIG. 4C is slightly different from that in FIG. 4A. Specifically, in FIG. 4C, the switch circuit 32 and the DC conversion circuit 34 are connected in parallel. That is, a first terminal of the switch circuit 32 is coupled to a first terminal of the DC conversion circuit 34 and the first output terminal A, and a second terminal of the switch circuit 32 is coupled to a second terminal of the DC conversion circuit 34 and the second output terminal B. Also, switch circuit 32 is used as the bypass switch 36 in FIG. 4B, that is, in addition to providing the operation of FIG. 4A, the switch circuit 32 of FIG. 4C is selectively turned on in response to the difference between the output voltage Vo and the auxiliary voltage Va to replace the function of the bypass switch 36, thereby saving circuit costs.

Figure 4D:
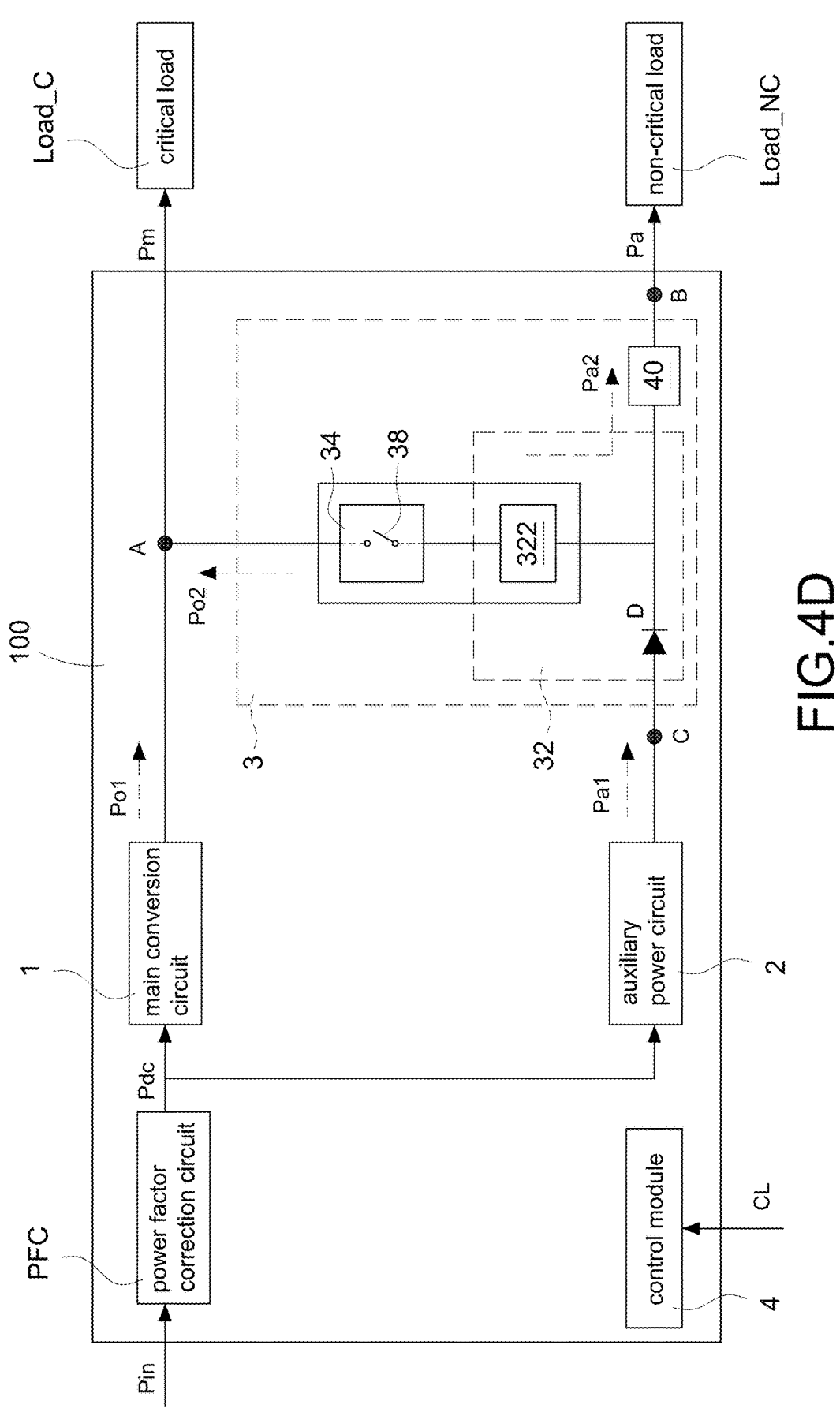
FIG. 4D is a block circuit diagram of the output control circuit according to a fifth embodiment of the present disclosure.

Please refer to FIG. 4D, which shows a block circuit diagram of the output control circuit according to a fifth embodiment of the present disclosure, and also refer to FIG. 2A to FIG. 4C. The difference between FIG. 4D and FIG. 4A is that the switch circuit 32 is integrated into the DC conversion circuit 34 and is used as the protection switch 38 of the DC conversion circuit 34. The protection switch 38 functions like the protection switch 40 in FIG. 3A, and is mainly used as an isolation switch at the output terminal of the DC conversion circuit 34, and is mainly used to determine whether it can flow through the second output power Po2 or the second auxiliary power Pa2 by controlling the turning on and turning off of the protection switch 38.

Figure 5:
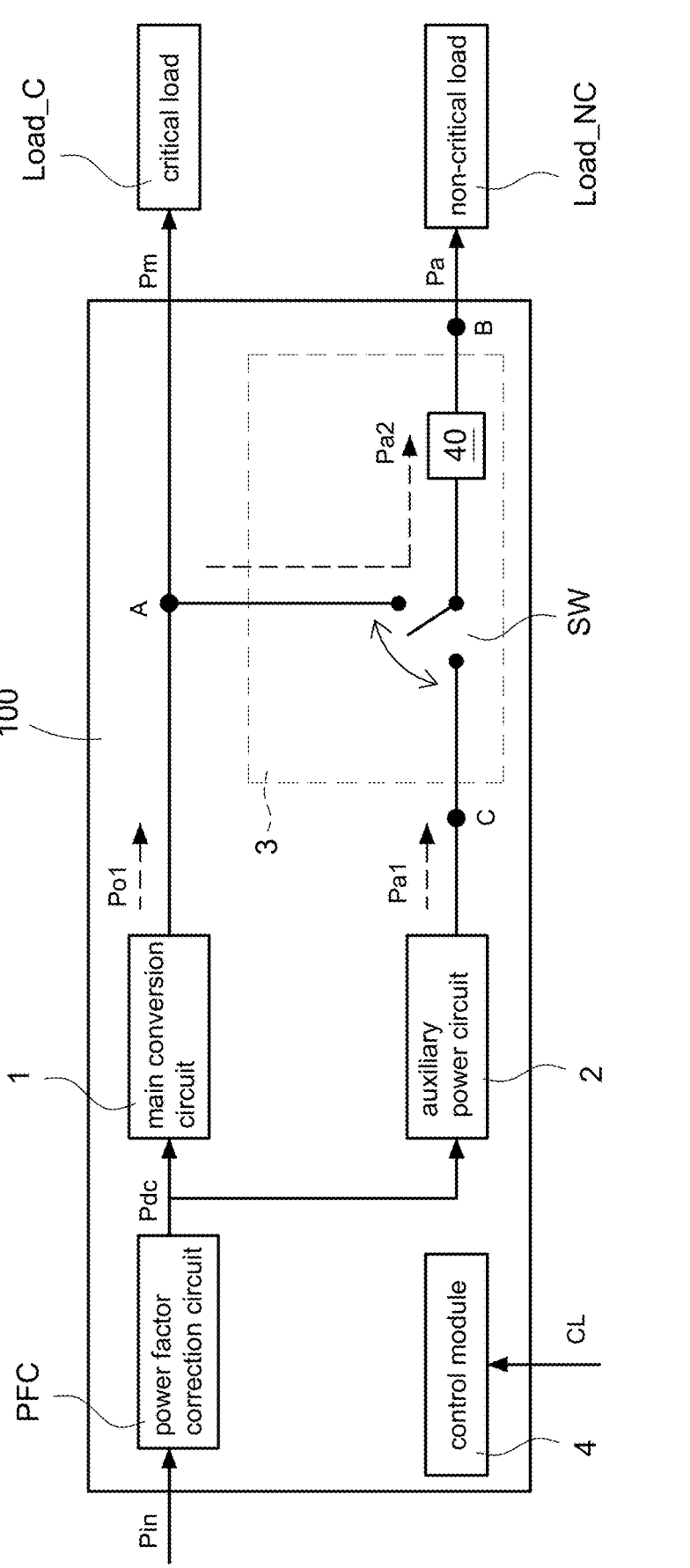
FIG. 5 is a block circuit diagram of the output control circuit according to a sixth embodiment of the present disclosure.

Please refer to FIG. 5, which shows a block circuit diagram of the output control circuit according to a sixth embodiment of the present disclosure, and also refer to FIG. 2A to FIG. 4D. The difference between FIG. 5 and FIG. 3A is that the output control circuit 3 includes a three-terminal switch SW, and the three-terminal switch SW includes a first terminal, a second terminal, and a third terminal. The first terminal is coupled to the first output terminal A, the second terminal is coupled to the second output terminal B, and the third terminal is coupled to the auxiliary power circuit 2 through the third output terminal C. The three-terminal switch SW is mainly similar to the operation manners described in FIG. 2A, selectively connecting the coupling relationship between the first output terminal A and the second output terminal B, or connecting the coupling relationship between the third output terminal C and the second output terminal B to provide power to the critical load Load_C and the non-critical load Load_NC accordingly. In one embodiment, the three-terminal switch SW may be replaced by two complementary on/off transistors, but it is not limited to this. Any switch with the same function should be included in the scope of this embodiment.

Figure 6A:
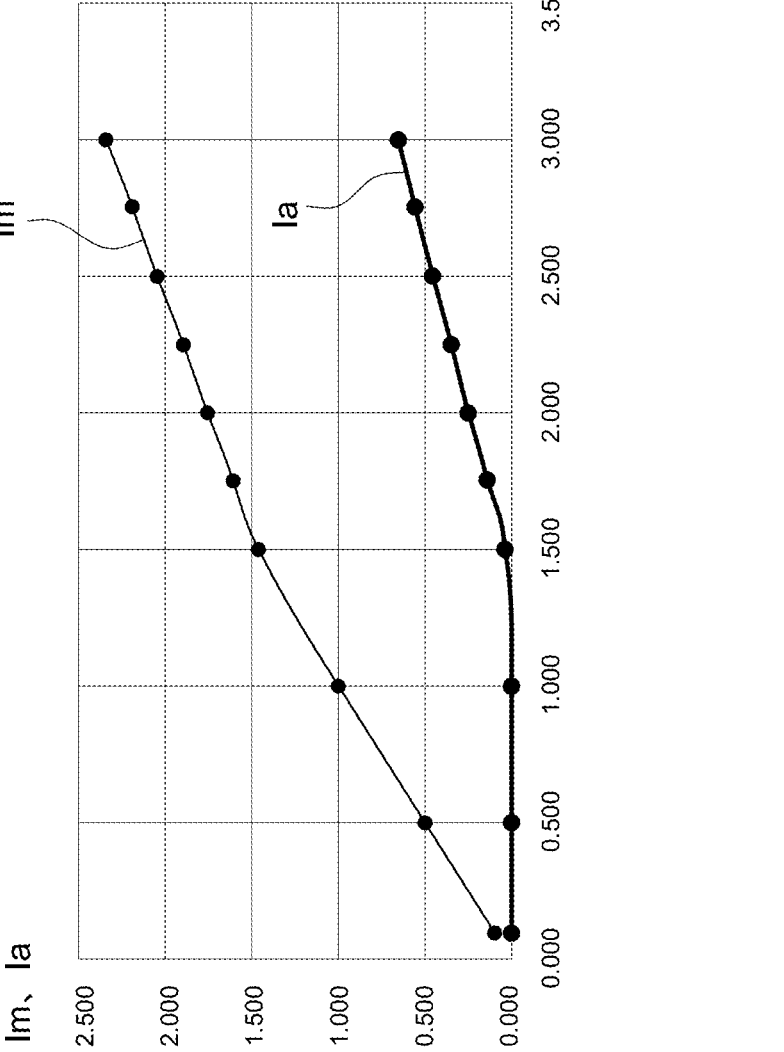
FIG. 6A is a load allocation curve diagram of a hybrid power supply mode according to a first embodiment of the present disclosure.
Figure 6B:
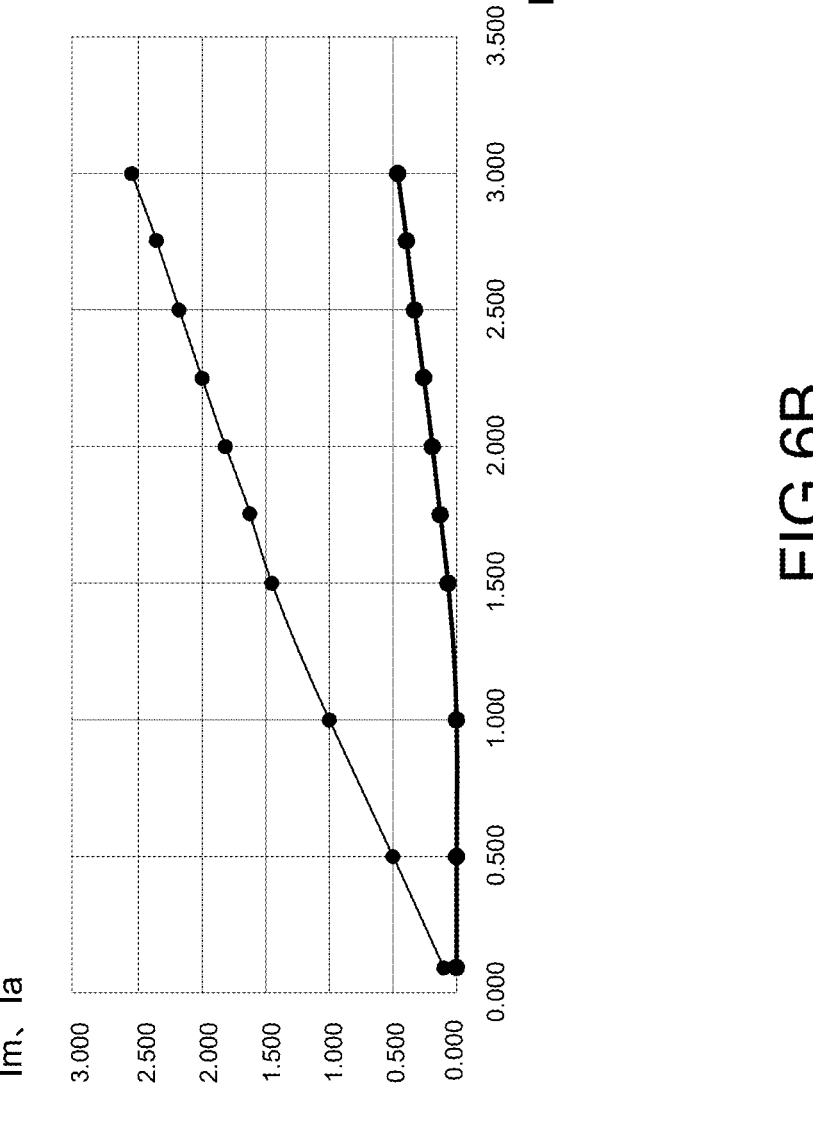
FIG. 6B is a load allocation curve diagram of a hybrid power supply mode according to a second embodiment of the present disclosure.

Please refer to FIG. 6A, which shows a load allocation curve diagram of a hybrid power supply mode according to a first embodiment of the present disclosure; please refer to FIG. 6B, which shows a load allocation curve diagram of a hybrid power supply mode according to a second embodiment of the present disclosure, and also refer to FIG. 2A to FIG. 5. Specifically, in addition to performing the above operation manners, the power supply 100 of the present disclosure may also provide a load deployment operation in a hybrid power supply mode. In the hybrid power supply mode, the power supply 100 can achieve efficient current conversion by setting voltage parameters. Specifically, in FIG. 6, the horizontal axis is the demand current In required to be supplied by the non-critical load Load_NC, and the vertical axis represents the respective output currents (Im, Ia) of the conversion circuit 1 and the auxiliary power circuit 2. In the hybrid power supply mode, the control module 4 may provide control signals to communicate with the conversion circuit 1 and the auxiliary power circuit 2 according to the demand current In of the non-critical load Load_NC to inform the conversion circuit 1 and the auxiliary power circuit 2 that they need to adjust the output current (Im, Ia) they need to provide. Therefore, after receiving the control signals from the control module 4, the controllers of the conversion circuit 1 and the auxiliary power circuit 2 adjust their output currents (Im, Ia) accordingly to achieve the function of hybrid power supply to the non-critical load Load_NC. Therefore, in the hybrid power supply mode, the non-critical load Load_NC can be jointly supplied power by the conversion circuit 1 and the auxiliary power circuit 2.

Therefore, referring to FIG. 6A, when the demand current In required by the non-critical load Load_NC is below the half load of the auxiliary power circuit 2 (assuming the half load is 1.5A), the demand current In can be provided by the main conversion circuit 1 to achieve a requirement of high efficiency. On the contrary, when the demand current In required by the non-critical load Load_NC is above half load (taking 2.5A as an example), the conversion circuit 1 provides a first output current Im of 2A, and the auxiliary power circuit 2 provides a second output current Ia of 0.5A, and so on, which will not be described in detail here. In addition, with reference to FIG. 6B, the power supply 100 can adjust the curve slope of the output current (Im, Ia) according to actual requirements so as to adjust the efficiency of the power supply 100 according to the adjustment of the curve slope, thereby optimizing the overall efficiency of the power supply 100.

Referring to FIG. 2A to FIG. to 6B again, various embodiments of operation of the output control circuit 3 are shown, and each embodiment can be selectively used in combination so that the features and functions of each embodiment can be combined with each other. For example, but not limited to, the hold-up time extension mode may be combined with the peak power mode so that the power supply 100 can have the characteristics and functions of increasing the hold-up time and providing peak power at the same time. For example, Table 2 below schematically applies the structure of FIG. 4B and integrates the operation modes of various embodiments of the output control circuit 3. In particular, Vo is the output voltage Vo of the conversion circuit 1 (default), and Va is the auxiliary voltage Va of the auxiliary power circuit 2 (default). When Vo=Va, the bypass switch 36 can be turned on so that the first output power Po1 or the first auxiliary power Pa1 can be provided to the other side through the path between the switch circuit 32 and the bypass switch 36. For example, but not limited to, when the power supply 100 wants to operate in the high-efficiency output mode and Vo<Va, the DC conversion circuit 34 operates in the boost mode, and the output voltage Vo is provided to the DC conversion circuit 34 for conversion through the first output terminal A, and is provided to the second output terminal B through the switch circuit 32. The rest may be deduced by analogy, and the detail description is omitted here for conciseness.

TABLE 2

| operation modes | Vo = Va | Vo < Va | Vo > Va |
|---|---|---|---|
| *operation manners of the output control circuit in different operation modes under the circuit structure of FIG. 4B* | | | |
| high-efficiency output mode | the bypass switch is turned on, and the power is transmitted through the bypass switch | the bypass switch is turned off, and the power is converted by the DC conversion circuit; the power flows from A to B, and the DC conversion circuit operates in the boost mode | the bypass switch is turned off, and the power is converted by the DC conversion circuit; the power flows from A to B, and the DC conversion circuit operates in the buck mode |
| hold-up time extension mode | the bypass switch is turned on, and the power is transmitted through the bypass switch | the bypass switch is turned off, and the power is converted by the DC conversion circuit; the power flows from B to A, and the DC conversion circuit operates in the buck mode | the bypass switch is turned off, and the power is converted by the DC conversion circuit; the power flows from B to A, and the DC conversion circuit operates in the boost mode |
| peak power mode | the bypass switch is turned on, and the power is transmitted through the bypass switch | the bypass switch is turned off, and the power is converted by the DC conversion circuit; the power flows from B to A, and the DC conversion circuit operates in the buck mode | the bypass switch is turned off, and the power is converted by the DC conversion circuit; the power flows from B to A, and the DC conversion circuit operates in the boost mode |

Figure 7:
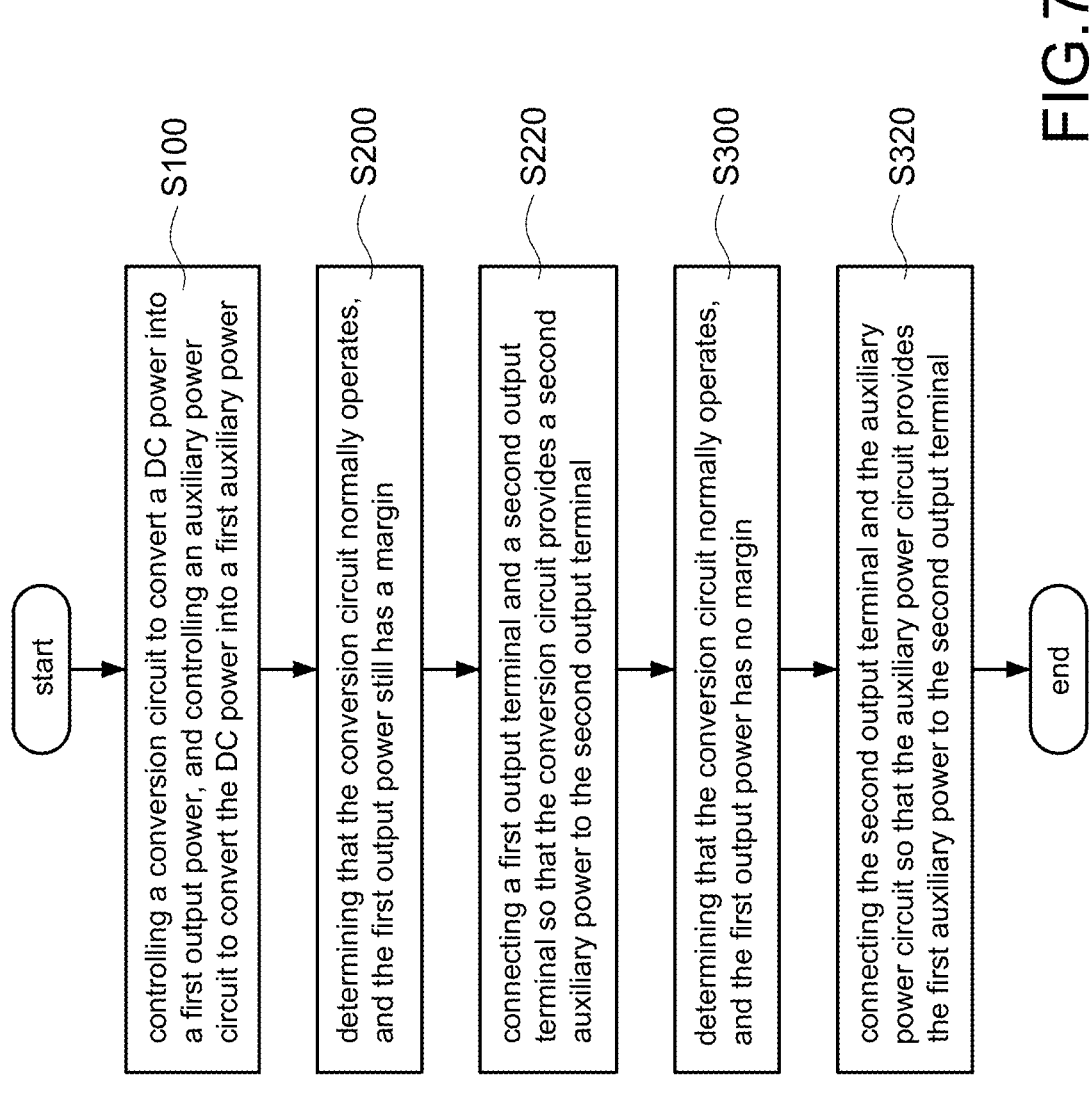
FIG. 7 is a flowchart of a load allocation method for the power supply according to the present disclosure.

Please refer to FIG. 7, which shows a flowchart of a load allocation method for the power supply according to the present disclosure, and also refer to FIG. 2A to FIG. 6B. The load allocation method of the present disclosure is mainly applicable to the power supply 100 shown in FIG. 2A, and the power supply 100 is used to supply power to the critical load Load_C through the first output terminal A. The power supply 100 is also used to supply power to the non-critical load Load_NC through the second output terminal B, and the load allocation method includes steps of: controlling the conversion circuit to convert the DC power into the first output power and controlling the auxiliary power circuit to convert the DC power into the first auxiliary power (S100). Afterward, determining that the conversion circuit normally operates, and the first output power still has a margin (S200). The preferred embodiment is to detect the conversion circuit 1 through the control module 4 to determine whether the conversion circuit 1 normally operates and whether the first output power Po1 still has a margin. Afterward, connecting the first output terminal and the second output terminal so that the conversion circuit provides the second auxiliary power to the second output terminal when the conversion circuit 1 normally operates and the first output power Po1 still has a margin (S220). When the first output terminal A and the second output terminal B are connected, the conversion circuit 1 can provide the second auxiliary power Pa2 to the second output terminal B through the path from the first output terminal A of the output control circuit 3 to the second output terminal B. Therefore, the non-critical load Load_NC can be supplied power by the second auxiliary power Pa2, and the loading of the auxiliary power circuit 2 can be transferred to the high-efficiency conversion circuit 1 by the control of the output control circuit 3.

On the contrary, determining that the conversion circuit normally operates, and the first output power has no margin (S300). Afterward, connecting the second output terminal and the auxiliary power circuit so that the auxiliary power circuit provides the first auxiliary power to the second output terminal when the conversion circuit 1 normally operates and the first output power Po1 has no margin (S320). When the second output terminal B is connected to the output terminal of the auxiliary power circuit 2 (i.e., the third output terminal C), the auxiliary power circuit 2 provides the first auxiliary power Pa1 to the second output terminal B through the output control circuit 3 so that the non-critical load Load_NC can be supplied power by the first auxiliary power Pa1. Through the above-mentioned operation of the power supply 100 in the high-efficiency output mode, the loading of the auxiliary power circuit 2 is transferred to the high-efficiency conversion circuit 1 by the control of the output control circuit 3 so as to reduce the loop loss of the power supply 100, increase the power density, and increase the efficiency. In one embodiment, for detailed procedures of the operation method of the power supply 100 not illustrated in FIG. 7 of the present disclosure, please refer to FIG. 2A to FIG. 6B and the detail description is omitted here for conciseness.

The second technical solution: electromagnetic interference suppression means.

Figure 8:
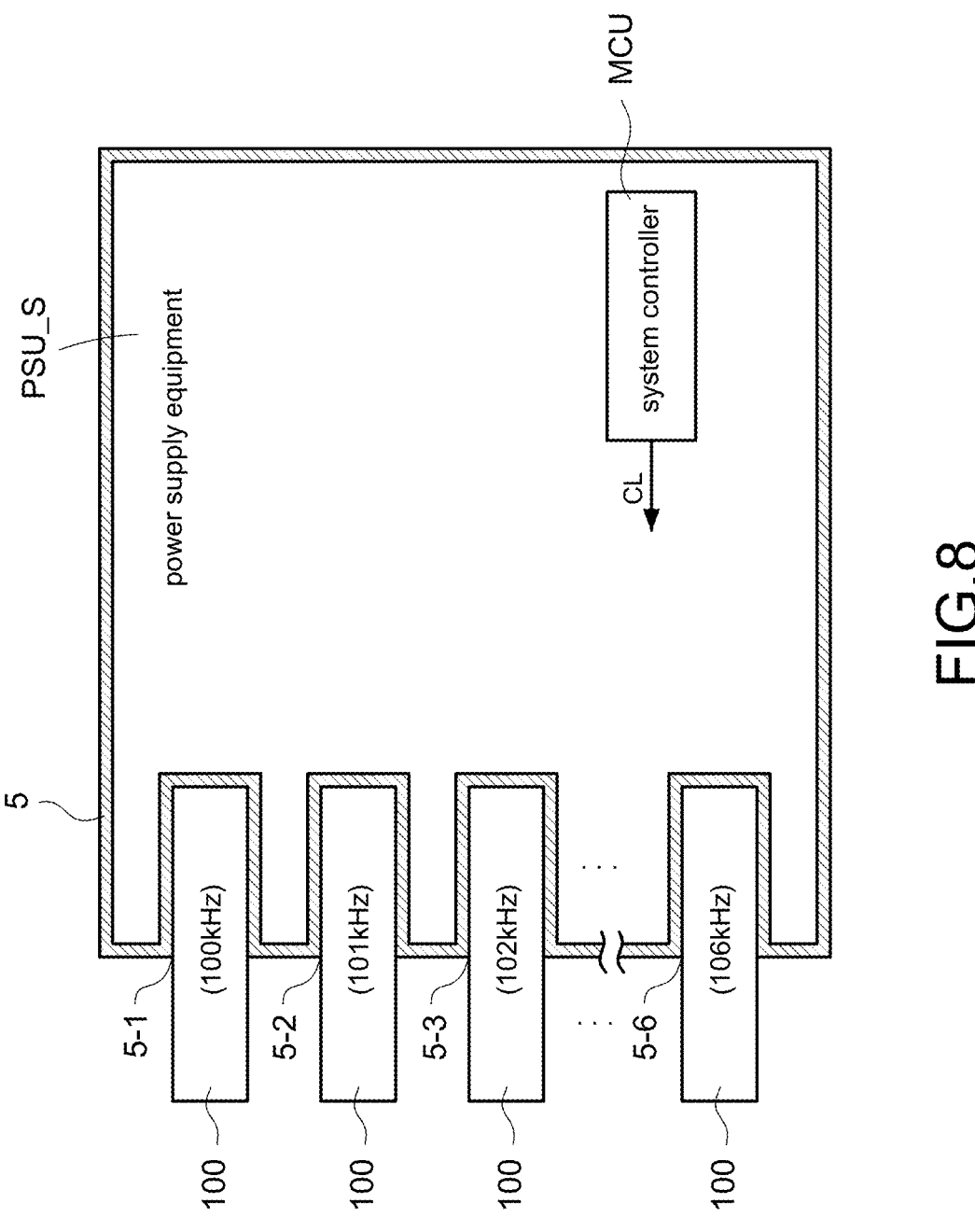
FIG. 8 is a block circuit diagram of a related-art power supply equipment.

As shown in FIG. 8, the power supply equipment PSU_S usually includes multiple power supplies 100 connected in parallel, which may cause problems of electromagnetic interference (EMI) or harmonic distortion of the multiple power supplies 100 and their standby power supplies. Specifically, since the power supply equipment PSU_S includes multiple power supplies 100 connected in parallel, overall noise harmonics will be superimposed, causing problems to the entire system of the power supply equipment PSU_S and its applications. The reason is that assuming that the operating frequency of a single power supply 100 is 100 kHz, since the multiple power supplies 100 of the power supply equipment PSU_S all work at the same frequency, the total noise will be superimposed at the same frequency point (i.e., superimposed at 100 kHz). In practice, the superposition of total noise in the power supply equipment PSU_S on each power supply 100 can be attributed to a number of factors, including the range and size of the frequency jitter and the controller parameters. These factors contribute to a systematic loss of the power supply equipment PSU_S.

Therefore, the present disclosure further transmits information about the relative position (that is, a physical location or a virtual address) of each power supply 100 in the power supply equipment PSU_S to the system controller MCU of the power supply equipment PSU_S or the control module 4 of each power supply 100. As shown in FIG. 8, it is assumed that the frame of the power supply equipment PSU_S is a physical cabinet 5 and includes a plurality of accommodation spaces 5-1 to 5-6 for each power supply 100 to be inserted into (for example, but not limited to, it may be rack). Moreover, the system controller MCU of the power supply equipment PSU_S may determine the accommodation space 5 through detection means (such as but not limited to determine whether the power supply 100 is installed in the accommodation spaces 5-1 to 5-6. Moreover, according to the actual position of each power supply 100 from the accommodation spaces 5-1 to 5-6 in a specific direction (for example, but not limited to, from top to bottom, the power supplies 100 are sorted (that is, arranged in a specific sequence). For example, in the event of an unoccupied position within the accommodation spaces 5-1 to 5-6, it is permissible to bypass this position and proceed with the sorting process, but this is not a limitation. Alternatively, the system controller MCU may also, for example but not limited to, when one of the power supplies 100 is inserted into one of the accommodation spaces 5-1 to 5-6, the virtual address of the inserted power supply 100 is set, and sort the power supplies 100 in sequence according to the insertion sequence (that is, arrange them in a specific sequence). That is, the system controller MCU can set a plurality of virtual addresses according to the insertion sequence of the power supplies 100, and the system controller MCU arranges the power supplies 100 in a specific sequence according to the sequence of the virtual addresses. In particular, the system controller MCU is capable of communicating with each other by being coupled to the control modules 4 of each power supply 100 and can control each power supply 100 by providing control commands CL to the control module 4. Therefore, the control module 4 can perform corresponding controls according to the instructions of the system controller MCU.

Figure 9A:
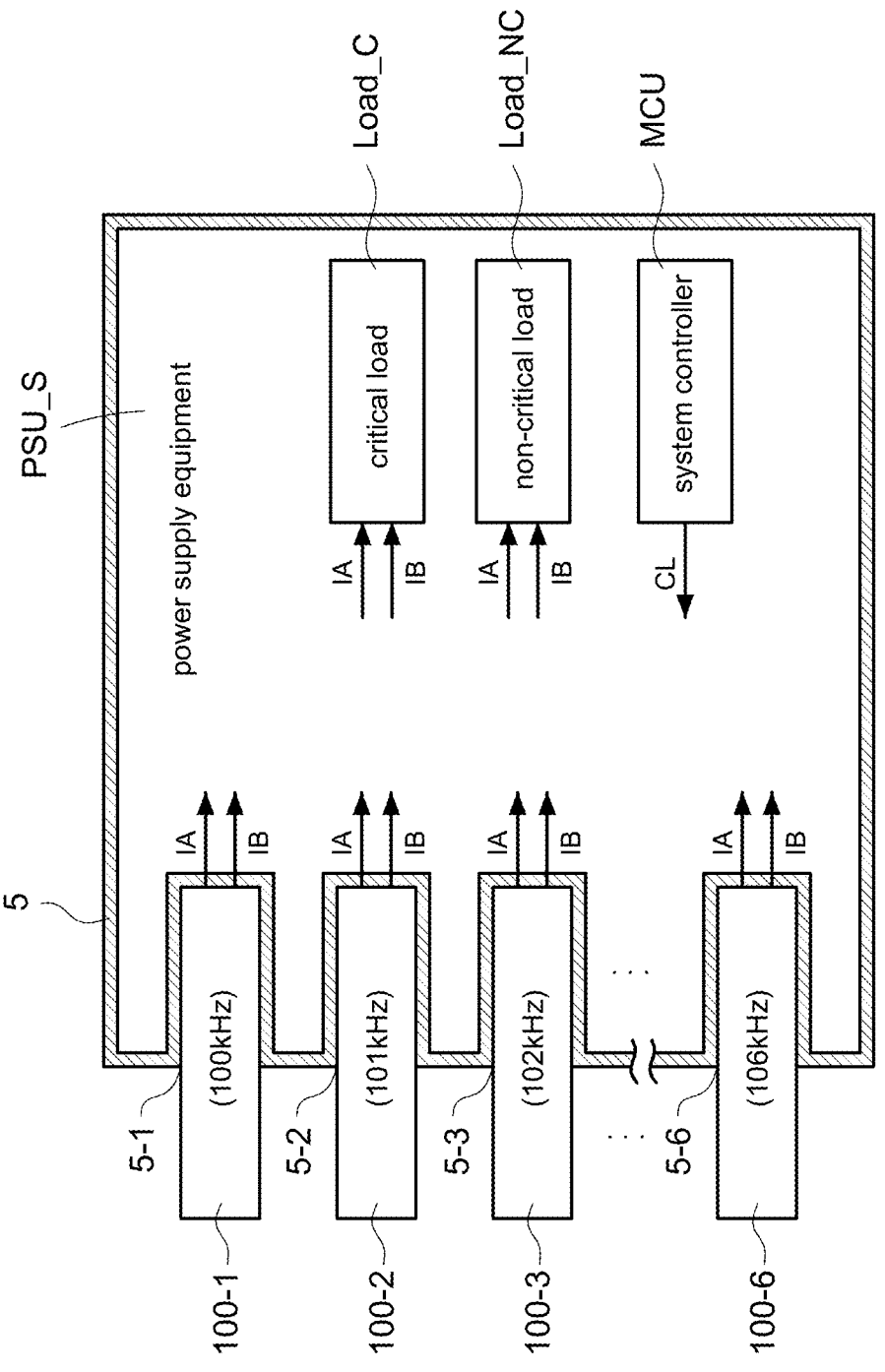
FIG. 9A is a block circuit diagram of a power supply equipment according to a first embodiment of the present disclosure.
Figure 9B:
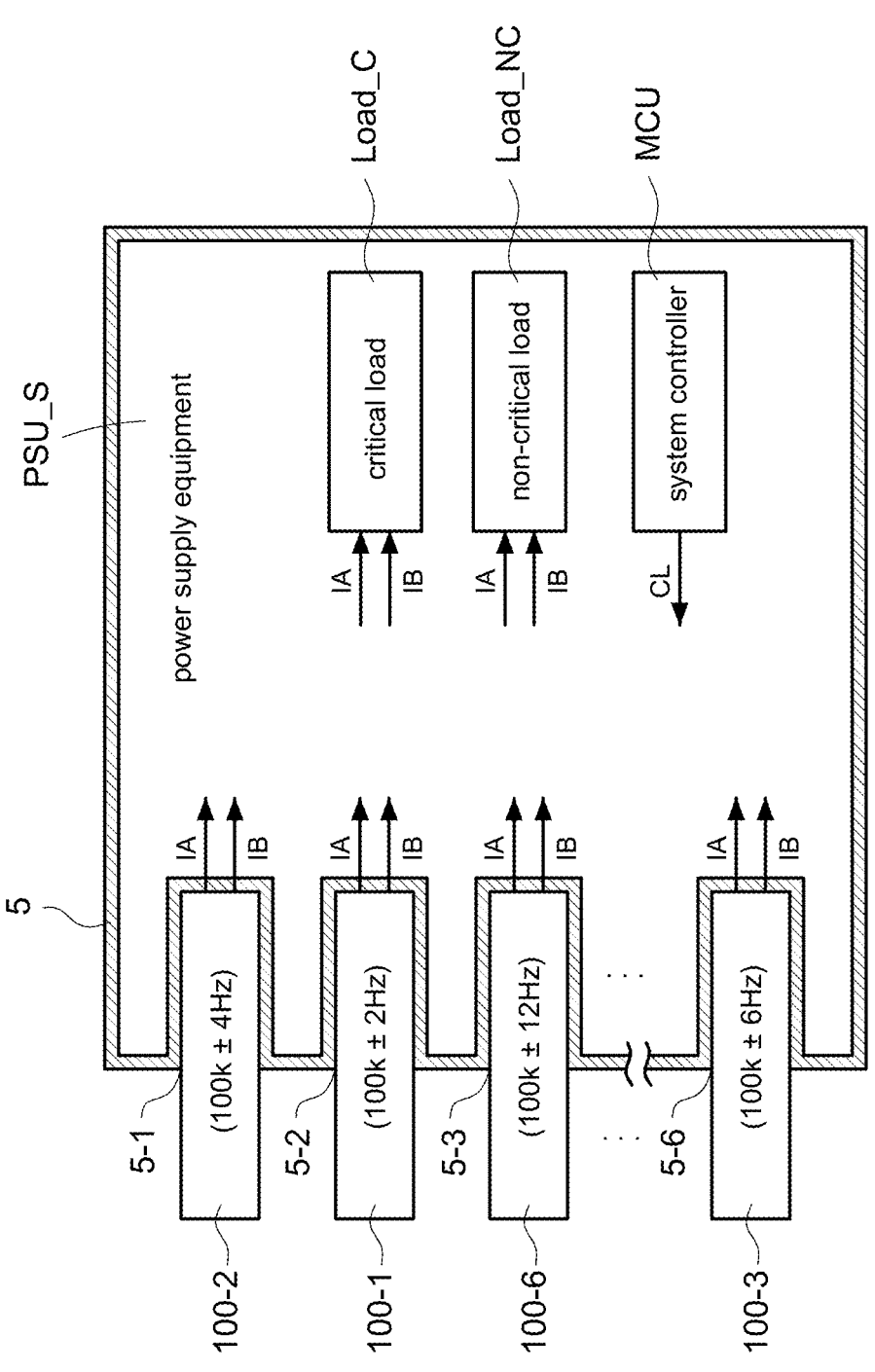
FIG. 9B is a block circuit diagram of the power supply equipment according to a second embodiment of the present disclosure.
Figure 9C:
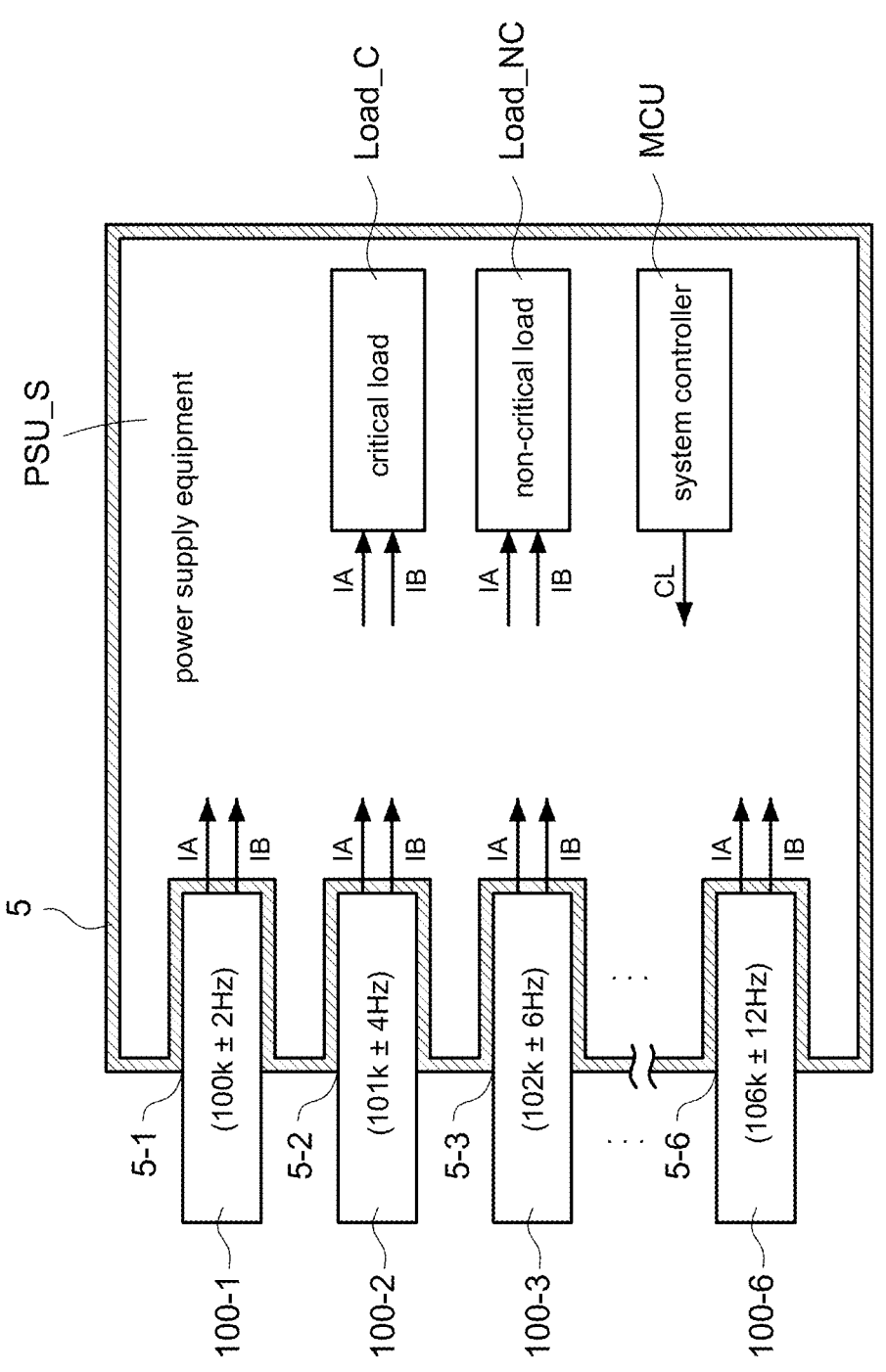
FIG. 9C is a block circuit diagram of the power supply equipment according to a third embodiment of the present disclosure.

After the specific sequence is completed, the system controller MCU can communicate with the control modules 4 of each power supply 100 through communication to stagger the operating frequencies of each power supply 100 so that the accumulation of noise at the system level can be reduced. Specifically, as shown in FIG. 9A to FIG. 9C, since the power supply device PSU_S can fine-tune the operating frequency of each power supply 100 to be inconsistent, in FIG. 9A, the system controller MCU arranges a specific sequence of the power supplies 100-1 to 100-6 according to the actual positions from top to bottom of the accommodation spaces 5-1 to 5-6, and sets different operating frequencies of the power supply 100-1 to 100-6 according to a specific sequence (for example, but not limited to, 100 kHz, 101 kHz, 102 kHz and other operating frequencies with different sequence levels, and so on. In this way, the operating frequencies of each power supply 100-1 to 100-6 can be staggered to prevent multiple power supplies 100 from all working at the same frequency and causing the sum of their noises to be superimposed at the same frequency point. Thus, it can reduce the accumulation of noise at the system level and suppress electromagnetic interference. It is worth mentioning that in one embodiment, the above example uses an example in which the sequence levels increase sequentially as an illustration. However, the sequence levels can also be implemented in a sequentially decreasing manner (for example, but not limited to, 100 kHz, 99 kHz, 98 kHz and other operating frequencies with different sequence levels, and so on).

In FIG. 9B, the system controller MCU arranges a specific sequence of the power supplies 100-1 to 100-6 according to the virtual address set for each power supply 100 and sets power supplies 100-1 to 100-6 to frequency jitter operation according to a specific sequence, and the frequency jitter range of the operating frequency is set to be different (for example, but not limited to, 100±2 kHz, 100±4 kHz, 100±6 kHz, etc.), and other embodiments of sequential increase or sequential decrease that are not shown can be deduced in the same way and will not be described again.) Therefore, similar effects to the power supply device PSU_S in FIG. 9A can be achieved. In FIG. 9C, the system controller MCU arranges a specific sequence of the power supplies 100-1 to 100-6 according to the actual positions from top to bottom of the accommodation spaces 5-1 to 5-6, and integrates the frequency adjustment functions of FIG. 9A and FIG. 9B. Specifically, in addition to setting different operating frequencies of the power supplies 100-1 to 100-6 in a specific sequence (that is, different sequence levels), the system controller MCU also sets frequency jitter range of the power supply 100-1 to 100-6 (for example, but not limited to, increasing 101±2 kHz, 102±4 kHz, 104±6 kHz, etc. on this basis, and other embodiments of sequential increasing or sequential decreasing that are not shown may be deduced by analogy and will not be described again here). Therefore, the range of frequency changes may be larger so that the total noise is less likely to superimpose at the same frequency point, which can further reduce the accumulation of noise at the system level and provide better suppression of electromagnetic interference.

In addition, with reference to FIG. 2A to FIG. 9C, each of the power supplies 100-1 to 100-6 in the power supply equipment PSU_S of the present disclosure may include a circuit structure as shown in FIG. 2A. That is, each power supply 100-1 to 100-6 includes a conversion circuit 1, an auxiliary power circuit 2, an output control circuit 3, and a control module 4. The first output terminal A of each power supply 100-1 to 100-6 is connected in parallel and coupled to the critical load Load_C, and the second output terminal B of each power supply 100-1 to 100-6 is connected in parallel and coupled to the non-critical load Load_NC. Therefore, the high-efficiency output mode, extension hold-up time mode, and peak power mode described in FIG. 2A to FIG. 6B may have special control strategies based on the structure of the power supply device PSU_S of FIG. 8 to FIG. 9C including multiple power supplies 100.

Figure 10A:
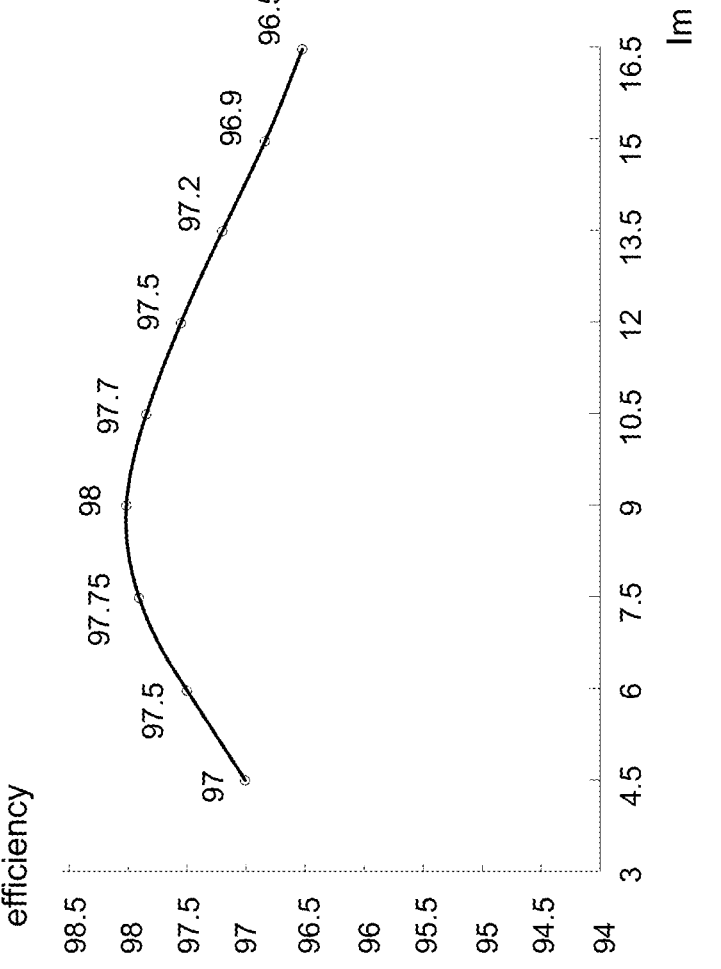
FIG. 10A is a schematic curve diagram showing the maximum efficiency of 98% of a conversion circuit shown in FIG. 2A.
Figure 10B:
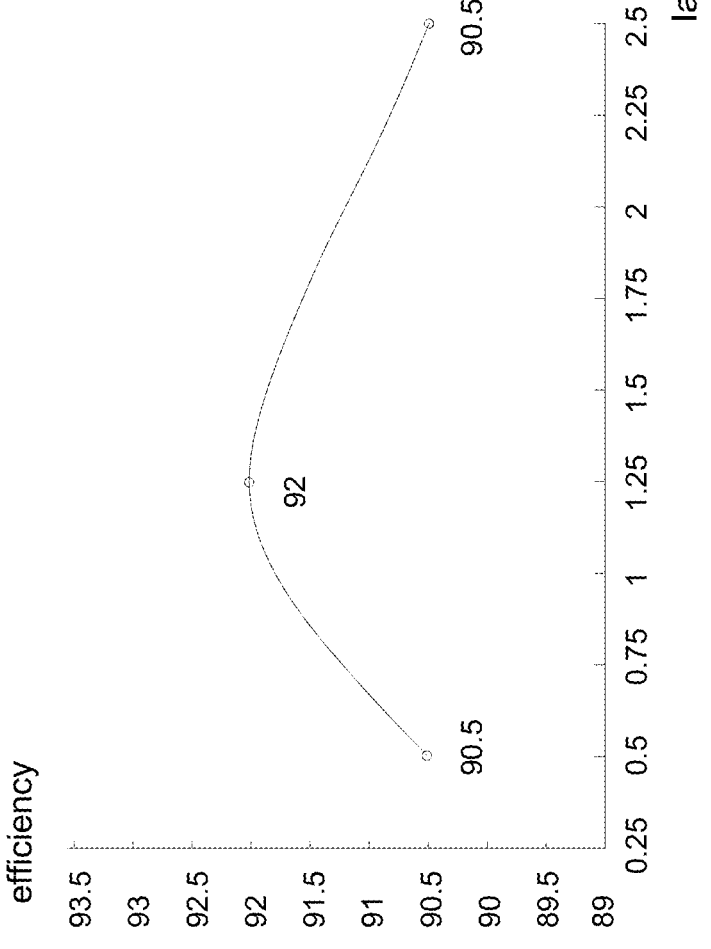
FIG. 10B is a schematic curve diagram showing the maximum efficiency of 92% of an auxiliary power circuit shown in FIG. 2A.

Furthermore, as shown in FIG. 10A and FIG. 10B, the maximum efficiencies of the conversion circuit 1 and the auxiliary power circuit 2 shown in FIG. 2A are 98% and 92% respectively. In FIG. 10A and FIG. 10B, when the conversion circuit 1 and the auxiliary power circuit 2 of the power supply 100 are operating, there will be different efficiencies (i.e., no load to full load is 0% to 100%) depending on the loading of the critical load Load_C. In general, the optimal efficiency will be achieved at a specific loading (for example, but not limited to, when the loading is approximately 50%). Therefore, the system controller MCU may adjust the first output current Im provided by the conversion circuit 1 of each power supply 100 according to the power demand of the critical load Load_C and the first optimal efficiency of the conversion circuit 1 of each power supply 100-1 to 100-6 to increase the operating efficiency of the power supplies 100-1 to 100-6 as much as possible.

In particular, the optimal efficiency is basically dynamic (as shown in FIG. 10A and FIG. 10B), and the reason is that the loadings of the critical load Load_C and the non-critical load Load_NC are not fixed values and are not determined by the power supply equipment PSU_S. Therefore, it is assumed that the first output current Im of the conversion circuit 1 is 6A, 9A, and 12A, the corresponding efficiencies of the conversion circuit 1 are 97.5%, 98%, and 97.5% respectively (as shown in FIG. 10A), and which are increased/decreased according to its connection trend, the system controller MCU will operate each conversion circuit 1 of the power supply device PSU_S to provide a first output current Im of 9A as much as possible so that its optimal efficiency can reach 98%. Taking the six groups of power supplies 100-1 to 100-6 in FIG. 9A as an example, it is assumed that the power demand of the critical load Load_C is 59A. Therefore, after calculation and distribution by the system controller MCU, the system controller MCU can distribute the current IA of 10A to be provided by the first output terminal A of the power supplies 100-1 to 100-5, and distribute the current IA of 9A to the first output terminal A of the power supply 100-6. Therefore, the efficiency of the power supplies 100-1 to 100-5 can reach 97.9%, and the efficiency of the power supply 100-6 can reach 98% so that the power supplies 100-1 to 100-6 can be maintain in high-efficiency operation.

However, if the loadings of the critical load Load_C and the non-critical load Load_NC are too high, the conversion circuit 1 operates such that even if it provides the first output current Im of 9A, it still cannot meet the requirements of the critical load Load_C and the non-critical load Load_NC. At this time, the system controller MCU can operate the conversion circuit 1 in a state with higher efficiency as much as possible. Therefore, in addition to adjusting the first output current Im provided by the conversion circuit 1 of each power supply 100-1 to 100-6, the system controller MCU may attempt to maintain the efficiency of each conversion circuit 1 at the optimal efficiency as much as possible by adjusting the number of supplies supplied by the conversion circuit 1 to the critical load Load_C and the non-critical load Load_NC.

Specifically, the system controller MCU can selectively control the output control circuit 3 of at least one of the power supplies 100-1 to 100-6 to disconnect the first output terminal A and the second output terminal B according to the power requirements of the critical load Load_C and the non-critical load Load_NC and the first optimal efficiency of the conversion circuit 1 of each power supply 100-1 to 100-6 so that the efficiency of each conversion circuit 1 is maintained at the optimal efficiency as much as possible. Taking the six groups of power supplies 100-1 to 100-6 in FIG. 9A as an example, it is assumed that the power requirements of the critical load Load_C and the non-critical load Load_NC are 46.5A and 7.5A respectively, and the total power requirement is 54A. Therefore, after calculation and distribution by the system controller MCU, both the first output terminal A and the second output terminal B of the output control circuit 3 of the power supplies 100-1 to 100-5 are connected, and the current IA of 7.5A is distributed to be provided by the first output terminal A, and the current IB of 1.5A is distributed to be provided by the second output terminal B. Moreover, the first output terminal A and the second output terminal B of the output control circuit 3 of the power supply 100-6 are disconnected, and the current IA of 9A is provided by the first output terminal A, and the current IB is not provided by the second output terminal B of the power supply 100-6. Therefore, the conversion circuit 1 of each power supply 100-1 to 100-6 provides the first output current Im of 9A, which enables the conversion circuit 1 to achieve the optimal efficiency of 98% (see FIG. 10A).

Moreover, the system controller MCU can selectively control the output control circuits 3 of the power supplies 100-1 to 100-6 to connect the first output terminal A and the second output terminal B in response to certain specific total power requirements, and allocate the specific current IB to be provided by the second output terminal B, and control the first output terminal A of at least one power supply 100-1 to 100-6 not to provide the current IA to maintain the optimal efficiency. Taking the six groups of power supplies 100-1 to 100-6 in FIG. 9A as an example again, it is assumed that the power requirements of the critical load Load_C and the non-critical load Load_NC are 45A and 9A respectively, and the total power requirement is 54A. Therefore, after calculation and distribution by the system controller MCU, the current IA of 9A is distributed to be provided by the first output terminal A of the power supplies 100-1 to 100-5, and the current IB of 9A is distributed to be provided by the second output terminal B of the power supply 100-6. Therefore, the second output terminals B of the power supplies 100-1 to 100-5 do not provide the current IB, and the first output terminal A of the power supply 100-6 does not provide the current IA.

In addition to the above examples, the system controller MCU can adjust at least one of the power supplies 100-1 to 100-6 to standby, sleep, or temporarily turn off according to the power requirements of the critical load Load_C and the non-critical load Load_NC and the first optimal efficiency of the conversion circuit 1 of each power supply 100-1 to 100-6. Taking the six sets of power supplies 100-1 to 100-6 in FIG. 9A as an example again, it is assumed that the power requirements of the critical load Load_C and the non-critical load Load_NC are 37.5A and 7.5A respectively, and the total power requirement is 45A. Therefore, after calculation and distribution by the system controller MCU, both the first output terminal A and the second output terminal B of the output control circuit 3 of the power supplies 100-1 to 100-5 are connected, and the current IA of 7.5A is distributed to be provided by the first output terminal A, and the current IB of 1.5A is distributed to be provided by the second output terminal B. Moreover, since the power supplies 100-1 to 100-5 have fully shouldered the total power demand of 45A, the system controller MCU can adjust the power supply 100-6 to standby, sleep, or temporarily turn off to save the power consumption of the power supply 100-6 and maintain the efficient operation of the power supplies 100-1 to 100-5.

Please refer to FIG. 10, since the efficiency of the auxiliary power circuit 2 is poor, the system controller MCU is mainly forced to control the operation of the auxiliary power circuit 2 when the first output power Po1 has no margin. Specifically, when the conversion circuit 1 of the power supply 100-1 to 100-6 normally operates and the first output power Po1 has no margin (it generally occurs when the critical load Load_C is fully loaded), the system controller MCU can selectively connect the second output terminal B and the auxiliary power circuit 2 of each power supply 100-1 to 100-6, and adjust the second output current Ia provided by the auxiliary power circuit 2 of each power supply 100-1 to 100-6 2 according to the power demand of the non-critical load Load_NC and the second optimal efficiency of the auxiliary power circuit 2 of each power supply 100-1 to 100-6 (see FIG. 10B).

Taking the six groups of power supplies 100-1 to 100-6 in FIG. 9A as an example again, it is assumed that the power demand of the critical load Load_C is 99A, and the power demand of the non-critical load Load_NC is 5A. Therefore, after calculation by the system controller MCU, the first output current Im of each power supply 100-1 to 100-6 has reached full load output, and the first output power Po1 has no margin. Therefore, the current of 5 A required by the non-critical load Load_NC is fully borne by the auxiliary power circuit 2 of the power supply 100-1 to 100-6. Therefore, after calculation and distribution by the system controller MCU, the second output terminal B of the output control circuit 3 and the auxiliary power circuit 2 of the power supply 100-1 to 100-4 are connected, and the current of 1.25 A provided from each auxiliary power circuit 2 of the power supply 100-1 to 100-4 is distributed so that the current IB of 1.25A is distributed and provided by the second output terminal B of the power supply 100-1 to 100-4. Therefore, the efficiency of the auxiliary power circuit 2 of the power supply 100-1 to 100-4 can achieve the optimal efficiency of 92%. Since the power supplies 100-1 to 100-4 have fully shouldered the power demand of the non-critical load Load_NC (i.e., 5A), the system controller MCU can disconnect the second output terminals B and the auxiliary power circuits 2 of the power supplies 100-5 to 100-6 so that the power supplies 100-5 to 100-6 are adjusted to standby, sleep, or temporarily turn off to save the power consumption of the power supplies 100-5 to 100-6 and maintain the efficient operation of the power supplies 100-1 to 100-4.

Therefore, in the high-efficiency output mode (that is, each power supply 100-1 to 100-6 normally operates and can normally provide the first output power Po1), the system controller MCU can control the conversion circuit 1 of the power supply 100-1 to 100-6 to supply power to the critical load Load_C, and the system controller MCU controls the output control circuit 3 of the power supplies 100-1 to 100-6 to selectively connect or disconnect the first output terminal A and the second output terminal B according to the optimal efficiency so that the conversion circuit 1 of the power supply 100-1 to 100-6 selectively supplies power to the non-critical load Load_NC. In one embodiment, for the high-efficiency output mode of the power supply, the system controller MCU has many distribution manners based on the power requirements of the critical load Load_C and the non-critical load Load_NC. Therefore, those skilled in the art can derive from the above descriptions and illustrative examples, and will not be described again here.

Similarly, the extension hold-up time mode and the peak power mode of the present disclosure have similar operation modes to the above-mentioned high-efficiency output mode. Specifically, in the extension hold-up time mode (that is, when the first output power Po1 of each power supply 100-1 to 100-6 is not within the predetermined range), the system controller MCU can control the output control circuit 3 of at least one of the power supplies 100-1 to 100-6 to connect its own auxiliary power circuit 2 and the second output terminal B according to the second optimal efficiency (as shown in FIG. 10B) of the auxiliary power circuit 2 of each power supply 100-1 to 100-6 so that the at least one auxiliary power circuit 2 provides the second output current Ia to the second output terminal B. Taking the six groups of power supplies

100-1 to 100-6 in FIG. 9A, and it is assumed that the power supply equipment PSU_S has just been activated and the conversion circuit 1 has not yet completed activated, i.e., the conversion circuit 1 is not yet able to supply power, and therefore the first output power Po1 of each power supply 100-1 to 100-6 is not within the predetermined range, and the power demand of the non-critical load Load_NC is 5A as an illustrative example.

Under this condition, after calculation and distribution by the system controller MCU, the second output terminal B of the output control circuit 3 and the auxiliary power circuit 2 of the power supply 100-1 to 100-4 are connected, and the current of 1.25 A provided from each auxiliary power circuit 2 of the power supply 100-1 to 100-4 is distributed so that the current IB of 1.25A is distributed and provided by the second output terminal B of the power supply 100-1 to 100-4. Therefore, the efficiency of the auxiliary power circuit 2 of the power supply 100-1 to 100-4 can achieve the optimal efficiency of 92%. Moreover, the system controller MCU can disconnect the second output terminal B and the auxiliary power circuit 2 of the power supplies 100-5 to 100-6, and adjust the power supplies 100-5 to 100-6 to standby, sleep, or temporarily turn off to save the power consumption of the power supplies 100-5 to 100-6 and maintain the efficient operation of the power supplies 100-1 to 100-4.

Moreover, when at least one of the power supplies 100-1 to 100-6 normally operates, the first output power Po1 is not within the predetermined range, it means that the conversion circuit 1 enters over-voltage, over-current, and low-voltage protection, or the conversion circuit 1 fails and enters sleep, standby, or shutdown states. Therefore, the system controller MCU can connect the first output terminal A and the second output terminal B of the output control circuit 3 of at least one of the power supplies 100-1 to 100-6 (assumed to be the power supply 100-5) so that the auxiliary power circuit 2 of the power supply 100-5 provides the second output current Ia to the first output terminal A through its own output control circuit 3 to extend the hold-up time of the power supply 100-5. In addition, since the output terminals of the power supplies 100-1 to 100-6 are coupled in parallel, they have a bus bar formed by a common path. Therefore, the hold-up time of the power supply 100-5 needs to extend, the output control circuit 3 of the power supply 100-5 may also disconnect the first output terminal A and the second output terminal B so that the conversion circuit 1 of the power supplies 100-1 to 100-4 (i.e., except for the power supply 100-5) provides the first current Im to the first output terminal A of the power supply 100-5. By employing the above manners, extra power may be temporarily supplied to the output capacitor (not shown in the figure) of the conversion circuit 1 of the power supply 100-5, thereby extending the hold-up time of the conversion circuit 1 of the power supply 100-5.

Specifically, in the peak power mode (that is, when the first output power Po1 of the power supplies 100-1 to 100-6 cannot respond to the power demand of the critical load Load_C), the system controller MCU can control the auxiliary power circuit 2 of the power supplies 100-1 to 100-6 to supply power to the non-critical load Load_NC. Moreover, the system controller MCU controls the output control circuit 3 of the power supplies 100-1 to 100-6 to selectively connect the first output terminal A and the second output terminal B according to the second optimal efficiency of the auxiliary power circuit 2 of each power supply 100-1 to 100-6 (as shown in FIG. 10B) so that the auxiliary power circuit 2 of the power supplies 100-1 to 100-6 to selectively provide the second output current Ia to the first output terminal A.

Taking the six groups of power supplies 100-1 to 100-6 in FIG. 9A as an example, it is assumed that the power demand of the critical load Load_C is 104A and has a peak power demand (full load is 99A), and the power demand of the non-critical load Load_NC is 6A. After calculation by the system controller MCU, the first output current Im of each power supply 100-1 to 100-6 has reached full load output and is less than the power requirement of 5A, and the power demand of the non-critical load Load_NC is 6A. Therefore, the system controller MCU controls the auxiliary power circuit 2 of each power supply 100-1 to 100-6 to provide a second output current Ia of 1A to supply power to the non-critical load Load_NC. Moreover, the power demand of the critical load Load_C, which is less than 5A, is also supplemented by the additional second output current Ia provided by the auxiliary power circuit 2 of each power supply 100-1 to 100-6.

Therefore, the system controller MCU can control the output control circuit 3 of the power supplies 100-1 to 100-5 to connect the first output terminal A and the second output terminal B so that the auxiliary power circuit 2 of the power supplies 100-1 to 100-5 to provide a second output current Ia of 1A to the first output terminal A. Moreover, the system controller MCU can control the output control circuit 3 of the power supply 100-6 to disconnect the first output terminal A and the second output terminal B so that there is no need to provide the 1A second output current Ia to the first output terminal A. Therefore, the first output terminals A of the power supplies 100-1 to 100-5 are allocated to provide a current IA of 17.5A (where 16.5A is the first output current Im and 1A is the second output current Ia), and the second output terminal B is allocated to provide a current IB of 1A (where 1A is the second output current Ia). Moreover, the first output terminal A of the power supply 100-6 is allocated to provide a current IA of 16.5A (where 16.5A is the first output current Im), and the second output terminal B is allocated to provide a current IB of 1A (where 1A is the second output current Ia).

In conclusion, the above-mentioned disclosure can perform cooperative control of the control circuit 3 through the system controller MCU, and cooperate with the bus bar at the output terminals of the power supplies 100-1 to 100-6 so as to enable multiple systems in the power supplies 100-1 to 100-6 to cooperate to jointly respond to system hole-up time and/or peak power requirements.

In addition, the above-mentioned power supply 100 of the present disclosure can also selectively control one or more output control circuits 3 for collaborative control by the system controller MCU according to the energy margin provided by one or more auxiliary power circuits 2 so as to also meet the ITIC (information technology industry council) AC input voltage envelope specification under the hold-up time control.

Please refer to FIG. 11, which shows a flowchart of a method of operating the power supply equipment according to the present disclosure, and also refer to FIG. 9A to FIG. 9C. The disclosed power supply equipment PSU_S is mainly to prevent multiple parallel power supplies 100-1 to 100-6 from operating at the same operating frequency, resulting in overall noise harmonic superposition, thereby reducing system-level noise accumulation and suppressing electromagnetic interference. Specifically, the method of operating the power supply equipment of the present disclosure includes the follows steps. The power supply converts the input power according to the operating frequency to supply power to the critical loads and non-critical loads (S400). The control modules 4 of the power supplies 100-1 to 100-6 can respectively control the power factor correction circuit PFC according to the operating frequency (such as but not limited to 100 kHz) to convert the AC input power Pin into the DC power Pdc. Moreover, the conversion circuit 1 and the auxiliary power circuit 2 are controlled to respectively convert the DC power supply Pdc into the first output power Po1 and the first auxiliary power Pa1.

Afterward, a specific sequence is set by communicating with each power supply (S420). The information of the relative position of each power supply 100 (i.e., the physical position or virtual address) is transmitted to the system controller MCU of the power supply device PSU_S or the control module 4 of each power supply 100. Finally, the power supplies are notified to adjust their own operating frequencies according to the specific sequence so that the operating frequency of each power supply is adjusted to be inconsistent according to the specific sequence (S440). After the specific sequence is completed, the system controller MCU can communicate with the control module 4 of each power supply 100 through communication to stagger the operating frequencies of each power supply 100 so as to reduce the system-level noise accumulation. Specifically, as shown in FIG. 9A to FIG. 9C, the power supply device PSU_S can fine-tune the operating frequencies of each power supply 100 to be inconsistent. In one embodiment, for detailed operation procedures not illustrated in FIG. 11, please refer to FIG. 9A to FIG. 10B and their corresponding descriptions, and will not be described again here.

The third technical solution: miniaturized circuit board installation.

When the switch circuit 32 of the first technical solution is an active switch, it is usually implemented by a control chip. Since the control chip packages and pin functions of each manufacturer are different, the main circuit board needs to be rewired so that the output control circuit 3 may have the function of load allocation. In addition, when the switch circuit 32 of the first technical solution is a passive switch, although there is no problem with the active switch, the convenience during production of the power supply 100 should still be considered. That is, in some models, the power supply 100 may not have the function of the first technical solution, and in some models, an active switch or a passive switch may be selected according to actual requirements. Therefore, depending on the models, the output control circuit 3 cannot normally operate by simply replacing the control chip or circuit components, and it is often necessary to redesign the entire circuit of the power supply 100 in response to various requirements. In addition, due to the size and space limitations of the specific space where the output control circuit 3 is configured in the power supply 100, it is difficult to route all the circuits of various control chips and control circuits into this specific space. Therefore, the existing solutions to the above problems are as follows.

1. Peripheral components such as a specific manufacturer's control chip is arranged on the main circuit board of the power supply 100. However, this will result in the material source being limited to the control chip from a specific manufacturer, and once this specific control chip is unavailable, it will cause a material shortage problem.

2. The control chip is arranged on a small surface mount component circuit board (SMD PCB), and is inserted into the front side of the main circuit board of the power supply 100 (that is, the side is closer to the center point of the housing space of the power supply) by plugging. However, due to the space limitation of the high power density of the power supply 100, most of the space needs to accommodate large electronic components such as electrolytic capacitors, power inductors, and transformers, and therefore it will be difficult to provide a pluggable space.

Figure 12:
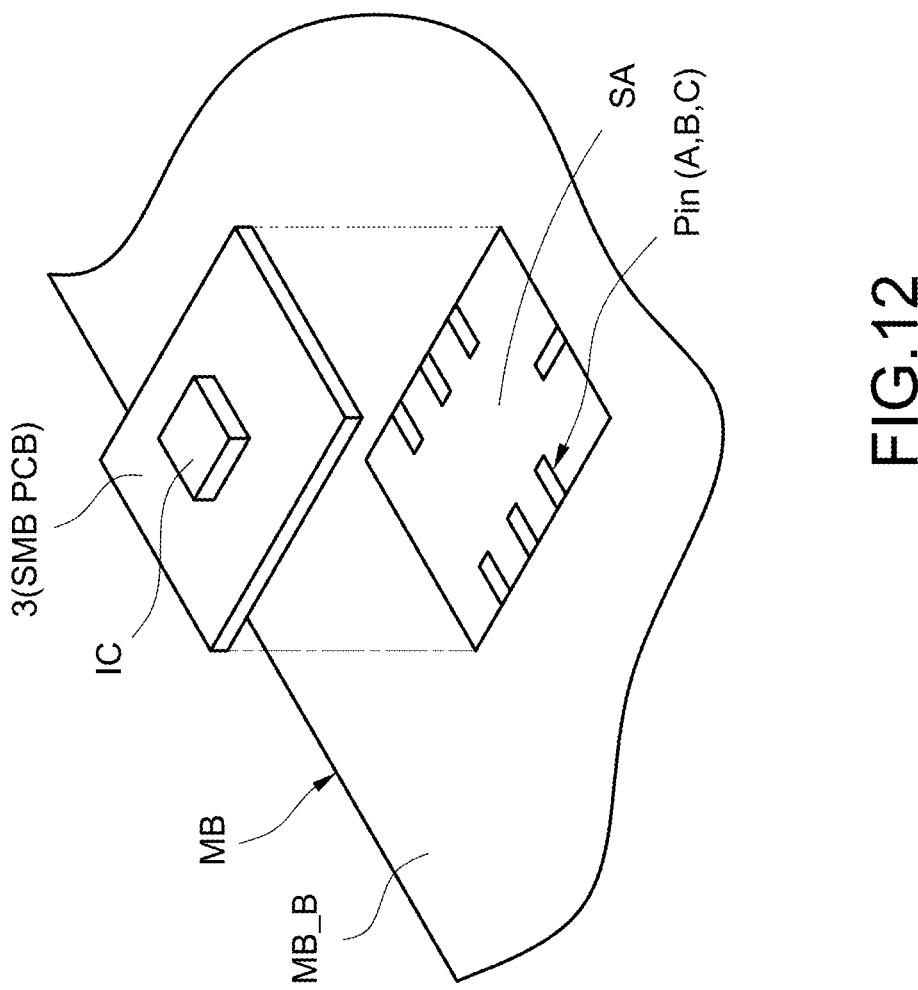
FIG. 12 is a circuit structure diagram of a switch circuit configured on a circuit board of the power supply according to the present disclosure.

Please refer to FIG. 12, which shows a circuit structure diagram of a switch circuit configured on a circuit board of the power supply according to the present disclosure, and also refer to FIG. 2A to FIG. 11. The present disclosure serves as a control chip IC for the switch circuit 32, or the hardware required for different power supply applications based on the conversion circuit 1 and the auxiliary power circuit 2, which can be soldered to a small surface mount component circuit board (SMD PCB, hereinafter referred to as the circuit board SMD PCB) on which the output control circuit 3 is disposed to form a modular structure. Specifically, the circuit board (SMD PCB) of the present disclosure may be designed with different circuit configuration structures based on different types of control chips ICs from various companies, but the size of the circuit board (SMD PCB) is the same as the modular structure. That is, the circuit board (SMD PCB) forms a specific configuration depending on the manufacturer of the control chip IC. Therefore, the control chip IC of the present disclosure may be of various brands and use different circuit configuration structures to be configured on the same size circuit board (SMD PCB), and the circuit board (SMD PCB) may be soldered to the specific area SA on the backside MB_B of the main circuit board MB of the power supply 100 by the printed circuit board mounting (PCB mounting) technology.

In particular, the main circuit board MB of the power supply 100 is used to configure the conversion circuit 1 and the auxiliary power circuit 2, and the main circuit board MB is placed on one of the inner surfaces of the housing space. Therefore, the backside MB_B of the main circuit board MB is usually close to the casing of the power supply 100 (not shown), and in the present disclosure, the backside MB_B of the main circuit board MB includes a specific area SA. The specific block SA includes a plurality of fixed contacts Pin, and the fixed contacts Pin at least include a first output terminal A, a second output terminal B, and a third output terminal C as shown in FIG. 2A. The circuit board (SMD PCB) is used to configure the output control circuit 3 and includes a plurality of soldering pads (not shown) and a control chip IC, and the control chip IC serves as the switch circuit 32 and is arranged on the circuit board (SMD PCB). The soldering pads are formed on a side, which is attached to the specific block SA, of the circuit board (SMD PCB), and the soldering pad is used to be correspondingly welded to the fixed contacts Pin on the specific block SA so that at least three fixed position pads of the output control circuit 3 are electrically connected to the first output terminal A, the second output terminal B, and the third output terminal C so as to provide functions of the output control circuit 3 as shown in FIG. 2A to FIG. 7.

Furthermore, since the circuit board (SMD PCB) is welded to the backside MB_B of the main circuit board MB to form a design that is flat on the main circuit board MB, and the control chip IC is usually not a large-volume circuit component, and the circuit board (SMD PCB) is not equipped with large-volume circuit components (such as but not limited to inductors, transformers, etc.), even if the specific space between the backside MB_B of the main circuit board MB and the inner surface of the chassis is small, the circuit board (SMD PCB) can still be arranged in the small specific space between the two. Moreover, even though the control chips ICs are designed by different manufacturers and have different pin positions and functions, they are all configured on the same size circuit board (SMD PCB), and therefore through the circuit design of the circuit board (SMD PCB), even if it is used in different circuit configuration structures of control chip ICs from different manufacturers, each pad on the circuit board (SMD PCB) has the same function (i.e., the same connection/output/input function) and is formed at a position corresponding to the fixed contact Pin. Therefore, the main circuit board MB may be mounted and electrically connected through printed circuit board mounting (PCB mount) technology.

Therefore, regardless of the manufacturer's control chip IC or circuit board (SMD PCB), the pad may be soldered to the corresponding fixed contact Pin in the main circuit board MB to provide the capability of connection/disconnection between the first output terminal and the second output terminal, which allows the circuit board (SMD PCB) to be adaptively configured on the motherboard to ensure good compatibility, thereby increasing motherboard commonality and reducing testing and wiring man-hours.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A power supply equipment, configured to supply power to a critical load and a non-critical load, the power supply equipment comprising:
   a plurality of power supplies, coupled in parallel, and each power supply comprising:
      a control module, configured to control one power supply belonging to the control module to convert an input power according to an operating frequency so as to supply power to the critical load and the non-critical load, and
      a system controller, coupled to the control module of each power supply, and configured to communicate with the control module to set a specific sequence,
   wherein the system controller is configured to notify the control modules of the plurality of power supplies to adjust the operating frequencies to be inconsistent according to the specific sequence.

2. The power supply equipment as claimed in claim 1, further comprising:
   a cabinet, comprising a plurality of accommodation spaces for the insertion of the power supplies,
   wherein the system controller is configured to determine whether the power supplies are installed in the accommodation spaces, and sequentially arrange the power supplies in the specific sequence according to actual positions of the power supplies in a specific direction from the accommodation spaces.

3. The power supply equipment as claimed in claim 1, further comprising:
   a cabinet, comprising a plurality of accommodation spaces for the insertion of the power supplies,
   wherein the system controller is configured to set a plurality of virtual addresses according to the insertion sequence of the power supplies, and arrange the power supplies in the specific sequence according to the sequence of the virtual addresses.

4. The power supply equipment as claimed in claim 1, wherein the system controller is configured to set sequence levels of the operating frequencies of the power supplies to be different according to the specific sequence.

5. The power supply equipment as claimed in claim 1, wherein the system controller is configured to set the power supplies to a frequency jittering operation according to the specific sequence, and set a frequency jitter range of the operating frequencies of the power supplies to be different.

6. The power supply equipment as claimed in claim 5, wherein the system controller is configured to set sequence levels of the operating frequencies of the power supplies to be different according to the specific sequence.

7. The power supply equipment as claimed in claim 5, wherein each power supply comprises:

a conversion circuit, configured to provide a first output current to the critical load through a first output terminal, and an output control circuit, coupled to the first output terminal and a second output terminal, and the second output terminal configured to couple to a non-critical load, wherein the system controller is configured to adjust a first output current provided by the conversion circuit of each power supply according to a power demand of the critical load and a first optimal efficiency of the conversion circuit of each power supply when the conversion circuit normally operates and a first output power of the conversion circuit still has a margin.

8. The power supply equipment as claimed in claim 7, wherein the system controller is configured to selectively turn on the first output terminal and the second output terminal of the at least one output control circuit of the power supplies according to power demands of the critical load and the non-critical load and the first optimal efficiency of the conversion circuit of each power supply.

9. The power supply equipment as claimed in claim 7, wherein the system controller is configured to adjust at least one of the power supplies to standby, sleep, or shut down according to power demands of the critical load and the non-critical load and the first optimal efficiency of the conversion circuit of each power supply.

10. The power supply equipment as claimed in claim 7, wherein each power supply comprises:

an auxiliary power circuit, configured to provide a second output current, wherein the system controller is configured to selectively turn on the second output terminal and the auxiliary power circuit of each power supply, and adjust the second output current provided by the auxiliary power circuit of each power supply to the non-critical load according to a power demand of the non-critical load and a second optimal efficiency of the auxiliary power circuit of each power supply when the conversion circuit normally operates and a first output power of the conversion circuit has no margin.

11. The power supply equipment as claimed in claim 10, wherein when the first output power of each power supply is not within a predetermined range, the system controller is configured to control at least one output control circuit of the power supplies to connect to at least one auxiliary power circuit and the second output terminal according to a second optimal efficiency of the auxiliary power circuit of each power supply so that the at least one auxiliary power circuit provides the second output current to the second output terminal.

12. The power supply equipment as claimed in claim 10, wherein when the first output power of the at least one power supply is not within a predetermined range, the at least one output control circuit is configured to connect the first output terminal and the second output terminal so that the at least one auxiliary power circuit provides the second output current to the first output terminal through the output control circuit to extend a hold-up time of the at least one power supply.

13. The power supply equipment as claimed in claim 10, wherein when the first output power of the at least one power supply is not within a predetermined range, the at least one output control circuit is configured to disconnect the first output terminal and the second output terminal so that the at least one conversion circuit provides the first current to the at least one first output terminal to extend a hold-up time of the at least one power supply.

14. The power supply equipment as claimed in claim 10, wherein when the first output power of the power supplies fails to respond to the power demand of the critical load, the system controller is configured to control the auxiliary power circuit of each power supply to supply power to the non-critical load, and control the output control circuit of each power supply to selectively connect the first output terminal and the second output terminal according to a second optimal efficiency of the auxiliary power circuit of each power supply so that the auxiliary power circuit of each power supply selectively provides the second output current to the first output terminal.

15. A method operating a power supply equipment, the power supply equipment configured to supply power to a critical load and a non-critical load, and the power supply equipment comprising a plurality of power supplies, the method comprising steps of:

converting an input power, by the power supplies, to supply power to the critical load and the non-critical load according to operating frequencies, communicating with each other of the power supplies to set a specific sequence, and notifying the power supplies to adjust the operating frequencies to be inconsistent according to the specific sequence.

16. The method of operating the power supply equipment as claimed in claim 15, further comprising steps of:

determining actual positions of the power supplies arranged in a specific direction according to a detection means, and sequentially arranging the power supplies in the specific sequence according to the actual positions in the specific direction.

17. The method of operating the power supply equipment as claimed in claim 15, further comprising steps of:

setting a plurality of virtual addresses according to an insertion sequence of the power supplies, and arranging the power supplies in the specific sequency according to the sequence of the virtual addresses.

18. The method of operating the power supply equipment as claimed in claim 15, further comprising a step of:

setting sequence levels of the operating frequencies of the power supplies to be different according to the specific sequence.

19. The method of operating the power supply equipment as claimed in claim 15, further comprising steps of:

setting the power supplies to a frequency jitter operation according to the specific sequence, and setting a frequency jitter range of the operating frequencies of the power supplies to be different.

\* \* \* \* \*